United States Patent [19]
Jensen et al.

[11] Patent Number: 6,005,856
[45] Date of Patent: Dec. 21, 1999

[54] COMMUNICATION PROTOCOL FOR SPREAD SPECTRUM WIRELESS COMMUNICATION SYSTEM

[75] Inventors: Ryan N. Jensen, Colorado Springs; Charles L. Lindsay, Monument; Claude M. Williams, Colorado Springs, all of Colo.

[73] Assignee: Omnipoint Corporation, Colorado Springs, Colo.

[21] Appl. No.: 08/668,483

[22] Filed: Jun. 21, 1996

Related U.S. Application Data

[63] Continuation-in-part of application No. 08/284,053, Aug. 1, 1994, which is a continuation-in-part of application No. 08/215,306, Mar. 21, 1994, abandoned, which is a continuation-in-part of application No. 08/146,496, Nov. 1, 1993, abandoned.

[51] Int. Cl.$^6$ ............... H04B 7/212; H04J 3/00
[52] U.S. Cl. ............ 370/337; 370/280; 370/468
[58] Field of Search ................. 370/347, 337, 370/342, 332, 331, 330, 322, 280, 263, 281, 252, 468, 345, 522, 350, 310, 328, 329, 336, 311, 348, 276, 277, 248, 294, 335, 437, 442; 455/502, 38.3, 69, 560, 452, 406, 436, 465, 461, 422, 442, 439, 435, 433; 375/208, 206, 317, 357, 330, 307, 331; 379/242, 90.01, 201, 229, 93.14, 210

[56] References Cited

U.S. PATENT DOCUMENTS

| | | | |
|---|---|---|---|
| 3,838,221 | 9/1974 | Schmidt | 370/324 |
| 4,222,115 | 9/1980 | Cooper et al. | 3735/1 |
| 4,301,530 | 11/1981 | Gutleber | 370/1 |
| 4,355,411 | 10/1982 | Reudink et al. | 455/33 |
| 4,418,393 | 11/1983 | Zachiele, Jr. | 364/724 |
| 4,418,425 | 11/1983 | Fennel, Jr. et al. | 455/27 |
| 4,432,089 | 2/1984 | Wurzburg et al. | 370/110.1 |

(List continued on next page.)

FOREIGN PATENT DOCUMENTS

| | | | |
|---|---|---|---|
| 0326104 | 2/1989 | European Pat. Off. | H04Q 7/04 |
| 9315573 | 8/1993 | WIPO | H04J 13/00 |
| 9406217 | 3/1994 | WIPO | H04B 7/005 |
| 9506365 | 3/1995 | WIPO | H04B 7/04 |
| 9512296 | 5/1995 | WIPO | H04Q 7/38 |

OTHER PUBLICATIONS

"Air Interface Considerations," Joint Experts Meeting, Rockwell International Nov. 9, 1992.

Nanda, Sanjiv et al., "Variable Partition Duplexing For Wireless Communications," *IEEE*, *GlobeCom* '91:1147–1153, 1991.

Collins, J.H. et al., "The Role of Surface Acoustic Wave Technology in Communication Systems", *Ultrasonics*, 10(2):59–71, Mar. 1972.

Dixon, Robert C., *Spread Spectrum Systems with Commercial Applications* (J. Wiley & Sons, 3d ed. 1994).

Radio Sub–system Synchronization, GSM Recommendation 05.10 (Ver. 3.5.1), Released by ETSI/PT, Oct. 1992.

Radio Equipment and Systems Digital European Cordless Telecommunications (DECT) Reference document, ETR 015, Mar. 1991.

(List continued on next page.)

*Primary Examiner*—Ajit Patel
*Attorney, Agent, or Firm*—Lyon & Lyon LLP

[57] ABSTRACT

A communication protocol for use in a mobile cellular communication system using time division duplex establishes a communication channel between a user station (e.g., a handset) and a base station in a time slot by assigning a first time segment within the time slot for a user station transmission and assigning a second time segment within the time slot for a base station transmission. The protocol also provides for virtual time slots wherein a time segment assigned for periodic transmission from the base station to a given user station may be non-contiguous with respect to the time segment assigned for periodic transmissions from the user station to the base station.

15 Claims, 13 Drawing Sheets

U.S. PATENT DOCUMENTS

| | | | |
|---|---|---|---|
| 4,456,793 | 6/1984 | Baker et al. | 179/99 R |
| 4,484,028 | 11/1984 | Kelley et al. | 179/2 DP |
| 4,525,835 | 7/1985 | Vance et al. | 370/29 |
| 4,538,281 | 8/1985 | Rajan | 380/31 |
| 4,587,662 | 5/1986 | Langewellpott | 375/1 |
| 4,612,637 | 9/1986 | Davis et al. | 370/95 |
| 4,653,069 | 3/1987 | Roeder | 380/31 |
| 4,658,096 | 4/1987 | West et al. | 379/59 |
| 4,672,658 | 6/1987 | Kavehrad | 379/63 |
| 4,675,863 | 6/1987 | Akiiiyama | 379/57 |
| 4,688,210 | 8/1987 | Eizenhöfer | 370/18 |
| 4,724,435 | 2/1988 | Moses et al. | 340/870.13 |
| 4,736,371 | 4/1988 | Tejima et al. | 370/95 |
| 4,742,512 | 5/1988 | Akashi et al. | 370/96 |
| 4,748,655 | 5/1988 | Thrower et al. | 455/461 |
| 4,754,453 | 6/1988 | Eizenhöfer | 370/95 |
| 4,763,325 | 8/1988 | Wolfe | 370/322 |
| 4,765,753 | 8/1988 | Schmidt | 379/60 |
| 4,769,812 | 9/1988 | Shimizu | 370/67 |
| 4,787,093 | 11/1988 | Rorden | 375/23 |
| 4,797,947 | 1/1989 | Labedz | 455/33 |
| 4,807,222 | 2/1989 | Amitay | 370/85 |
| 4,829,554 | 5/1989 | Barnes et al. | 379/58 |
| 4,833,702 | 5/1989 | Shitara et al. | 379/60 |
| 4,918,689 | 4/1990 | Hui | 370/85.9 |
| 4,942,570 | 7/1990 | Kotzin | 370/263 |
| 4,979,170 | 12/1990 | Gilhousen et al. | 370/104.1 |
| 4,984,247 | 1/1991 | Kaufmann et al. | 375/1 |
| 4,995,083 | 2/1991 | Baker et al. | 380/23 |
| 5,008,925 | 4/1991 | Pireh | 379/60 |
| 5,008,953 | 4/1991 | Dahlin et al. | 455/33 |
| 5,016,255 | 5/1991 | Dixon et al. | 375/1 |
| 5,016,261 | 5/1991 | Amoroso et al. | 375/317 |
| 5,022,046 | 6/1991 | Morrow | 375/1 |
| 5,022,047 | 6/1991 | Dixon et al. | 375/1 |
| 5,029,184 | 7/1991 | Andren et al. | 375/1 |
| 5,042,050 | 8/1991 | Owen | 375/1 |
| 5,042,082 | 8/1991 | Dahlin | 455/33 |
| 5,097,484 | 3/1992 | Akaiwa | 375/40 |
| 5,103,459 | 4/1992 | Gilhousen et al. | 375/1 |
| 5,109,390 | 4/1992 | Gilhousen et al. | 375/1 |
| 5,109,393 | 4/1992 | Saegusa | 375/357 |
| 5,111,535 | 5/1992 | Tokunaga | 455/33.2 |
| 5,117,423 | 5/1992 | Shepherd et al. | 370/95.1 |
| 5,157,661 | 10/1992 | Kanai et al. | 370/331 |
| 5,164,958 | 11/1992 | Omura | 375/206 |
| 5,166,929 | 11/1992 | Lo | 370/85.3 |
| 5,166,952 | 11/1992 | Omura et al. | 375/1 |
| 5,170,412 | 12/1992 | Massey | 375/1 |
| 5,177,765 | 1/1993 | Holland et al. | 375/1 |
| 5,177,766 | 1/1993 | Holland et al. | 375/1 |
| 5,179,571 | 1/1993 | Schilling | 375/1 |
| 5,193,101 | 3/1993 | McDonald et al. | 375/1 |
| 5,195,090 | 3/1993 | Bolliger et al. | 370/94.1 |
| 5,195,091 | 3/1993 | Farwell et al. | 370/94.1 |
| 5,200,956 | 4/1993 | Pudney et al. | 370/95.1 |
| 5,202,901 | 4/1993 | Chennakeshu | 375/331 |
| 5,210,771 | 5/1993 | Schaeffer et al. | 375/1 |
| 5,212,689 | 5/1993 | Eriksson | 370/334 |
| 5,212,724 | 5/1993 | Nazarenko et al. | 455/560 |
| 5,218,618 | 6/1993 | Sagey | 375/1 |
| 5,229,995 | 7/1993 | Strawczynski et al. | 370/280 |
| 5,235,615 | 8/1993 | Omura | 370/342 |
| 5,239,545 | 8/1993 | Buchholz | 370/348 |
| 5,239,572 | 8/1993 | Saegusa et al. | 379/61 |
| 5,241,690 | 8/1993 | Larsson et al. | 455/54.1 |
| 5,243,641 | 9/1993 | Evans et al. | 379/61 |
| 5,257,283 | 10/1993 | Gilhousen et al. | 375/1 |
| 5,260,987 | 11/1993 | Mauger | 455/560 |
| 5,263,047 | 11/1993 | Kotzin et al. | 375/1 |
| 5,265,119 | 11/1993 | Gilhousen et al. | 375/1 |
| 5,267,261 | 11/1993 | Blakeney, II et al. | 375/1 |
| 5,278,833 | 1/1994 | Crisler | 370/348 |
| 5,278,835 | 1/1994 | Ito et al. | 370/95.3 |
| 5,283,815 | 2/1994 | Chennakeshu | 375/330 |
| 5,285,469 | 2/1994 | Vanderpool | 375/1 |
| 5,289,497 | 2/1994 | Jacobson et al. | 375/1 |
| 5,291,475 | 3/1994 | Bruckert | 370/330 |
| 5,291,516 | 3/1994 | Dixon et al. | 375/1 |
| 5,299,198 | 3/1994 | Kay et al. | 370/95.3 |
| 5,303,287 | 4/1994 | Laborde | 379/59 |
| 5,313,457 | 5/1994 | Hostetter et al. | 370/18 |
| 5,313,467 | 5/1994 | Varghese | 370/468 |
| 5,319,634 | 6/1994 | Bartholomew et al. | 370/18 |
| 5,327,577 | 7/1994 | Uddenfeldt | 455/442 |
| 5,345,469 | 9/1994 | Fulghum | 370/342 |
| 5,345,498 | 9/1994 | Mauger | 455/406 |
| 5,353,303 | 10/1994 | Walthall | 375/1 |
| 5,363,373 | 11/1994 | Nakahara et al. | 370/95.1 |
| 5,375,140 | 12/1994 | Bustamante et al. | 375/206 |
| 5,376,894 | 12/1994 | Petranovich | 329/306 |
| 5,377,192 | 12/1994 | Goodings et al. | 370/348 |
| 5,392,287 | 2/1995 | Tiedemann, Jr. et al. | 370/95.1 |
| 5,392,459 | 2/1995 | Baba et al. | 455/69 |
| 5,398,247 | 3/1995 | Delprat et al. | 370/347 |
| 5,402,413 | 3/1995 | Dixon et al. | 370/18 |
| 5,410,568 | 4/1995 | Schilling | 375/205 |
| 5,416,779 | 5/1995 | Barnes et al. | 370/280 |
| 5,416,797 | 5/1995 | Gilhousen et al. | 375/705 |
| 5,418,838 | 5/1995 | Havermans et al. | 455/465 |
| 5,420,851 | 5/1995 | Seshadri et al. | 370/29 |
| 5,422,930 | 6/1995 | McDonald et al. | 379/58 |
| 5,422,933 | 6/1995 | Barnett et al. | 455/439 |
| 5,434,888 | 7/1995 | Fukuchi | 375/307 |
| 5,438,329 | 8/1995 | Gastouniotis et al. | 340/870.02 |
| 5,440,613 | 8/1995 | Fuentes | 455/436 |
| 5,442,682 | 8/1995 | Svedin et al. | 455/435 |
| 5,444,696 | 8/1995 | Petranovich | 370/337 |
| 5,446,727 | 8/1995 | Bruckert et al. | 370/18 |
| 5,454,028 | 9/1995 | Hara et al. | 379/61 |
| 5,455,822 | 10/1995 | Dixon et al. | 370/342 |
| 5,467,390 | 11/1995 | Brankley et al. | 379/229 |
| 5,469,468 | 11/1995 | Schilling | 375/200 |
| 5,479,400 | 12/1995 | Dilworth et al. | 370/331 |
| 5,481,533 | 1/1996 | Honig et al. | 370/18 |
| 5,483,676 | 1/1996 | Mahany et al. | 455/67.4 |
| 5,491,741 | 2/1996 | Farwell et al. | 370/347 |
| 5,497,424 | 3/1996 | Vanderpool | 380/34 |
| 5,509,015 | 4/1996 | Tiedemann | 370/311 |
| 5,521,925 | 5/1996 | Merakos et al. | 370/337 |
| 5,528,597 | 6/1996 | Gerszberg et al. | 370/347 |
| 5,530,700 | 6/1996 | Tran et al. | 370/461 |
| 5,537,458 | 7/1996 | Suomi et al. | 455/422 |
| 5,546,380 | 8/1996 | Tomasi et al. | 370/252 |
| 5,555,260 | 9/1996 | Rinnbäck et al. | 370/347 |
| 5,592,468 | 1/1997 | Sato | 370/252 |
| 5,610,940 | 3/1997 | Durrant et al. | 375/208 |
| 5,727,058 | 3/1998 | Blumhardt et al. | 379/242 |

OTHER PUBLICATIONS

European digital cellular telecommunications system (phase 1); Mobile Station—Base Station System (MS–BSS) interface data link layer specification, I–ETS 300 021, May 1992.

European digital cellular telecommunications system (phase 1); MS–BSS Layer 1—General Requirements, I–ETS 300 078, May 1992.

European digital cellular telecommunications system (Phase 2); Mobile Station—Base Station (MS–BSS) interface Data Link (DL) layer specification (GSM 04.06), ETS 300 555, Sep. 1994.

Hakizimana, Gaspard et al., "A New M–ary Wideband Communication System with Application to Multipath Channels—Part I: System Performance", *IEEE Transactions on Communications,* 43(1):127–135, Jan. 1995.

Mohanty, Nirode C., "Spread Spectrum and Time Division Multiple Access Satellite Communications", *IEEE Transactions on Communications,* Com–25(8):810–815, Aug. 1977.

Ruprecht, Jurg, "Code Time Division Multiple Access: A Method for the Orthogonalization of CDMA Signals in Multipath Environment", Aachener Kolloquium "Signal theorie", *Mobile Kommunikation Systems,* Mar. 1994, pp. 1–8.

Saleh, Adel A.M. et al., "An Experimental TDMA Indoor Radio Communications System Using Slow Frequency Hopping and Coding", *IEEE Transactions on Communications,* 39(1):152–161, Jan. 1991.

Sust, M. K. et al., "All Digital Signal Processing In A Spread Spectrum Communication System", *Proceedings of MELECON '87,* Mar. 24–26, 1987, pp. 157–161.

In the Matter of: Amendment of the Commission's Rules to Establish New Personal Communications Services—Comments of Omnipoint Communications, Inc., Dated: Nov. 9, 1992.

In the Matter of: Amendment of the Commission's Rules to Establish New Personal Communications Services—Reply Comments of Omnipoint Communications Inc., Dated: Mar. 1, 1993.

In the Matter of: Amendment of the Commisson's Rules to Establish New Personal Communications Services—Opposition to Motion for Leave to File Supplemental Comments, Dated: Aug. 11, 1993.

In the Matter of: Amendment of the Commission's Rules to Establish New Personal Communications Services—Comments, Received: Jan. 3, 1994.

In the Matter of: Amendment of the Commissions' Rules to Establish New Personal Communications Services—Adelphia Comm. Corp.—Satcom, Inc., Dated: Jun. 25, 1992.

In the Matter of: Request of Omnipoint Communications, Inc. For a Pioneer's Peference in the Licensing Process for Personal Communications Services (FCC Gen. Docket 90–314) Request for a Pioneer's Preference, Dated: May 4, 1992.

In Matter of: Omnipoint Corporation, Oracle Data Publishing, Inc., and McCaw Cellular Communications, Inc.— Request for a Pioneer's Preference, dated: May 4, 1992.

In the Matter of Omnipoint Corporation Amendment of the Commission's Rules to Establish New Personal Communications Services—Semi–Annual Experimental License Progress Report, Aug. 1993.

Omnipoint Data Experimental License Progress Report to the Federal Communications Commission—Oct. 28, 1991, Experimental License Issued Dec. 21, 1990.

Joint Technical Committee on Wireless Access (JTC)— Omnipoint Candidate Air Interface Solution [Includes Proprietary Information], Date: Nov. 1, 1993.

Joint Technical Committee on Wireless Access— JTC(Air)—Standards Contribution (Air Interface Standards Project), Date: Mar. 21, 1994.

Joint Technical Committee on Wireless Access— JTC(Air)—Draft PCS2000 Standard (PN–3390), Date: Sep. 23, 1994.

Omnipoint Corporation—*FCC Experimental License Semi-–annual Progress Report,* Apr. 1992.

Omnipoint Corporation—*FCC Experimental License Semi-–annual Progress Report* Rev. 01, May 1992.

Omnipoint Corporation—PCS2000—A Composite CDMA/ TDMA Air Interface Compatibility Standard For Personal Communication in 1.8—2.2 GHz For Licensed Applications, Feb. 2, 1995.

Omnipoint Corporation—PCS2000—A Composite CDMA/ TDMA Air Interface Compatibility Standard For Personal Communication in 1.8—2.2 GHz For Licensed And Unlicensed Applications, Aug. 1994.

N=3 FREQUENCY REUSE USING CDMA

COMMUNICATION PROTOCOL FOR SPREAD SPECTRUM WIRELESS COMMUNICATION SYSTEM

RELATED APPLICATION DATA

This application is a continuation-in-part of U.S. patent application Ser. No. 08/284,053, filed on Aug. 1, 1994 which is in turn a continuation-in-part of U.S. patent application Ser. No. 08/215,306 filed on Mar. 21, 1994, now abandoned, which is in turn a continuation-in-part of U.S. patent application Ser. No. 08/146,496 filed on Nov. 1, 1993, now abandoned, all of which foregoing applications are hereby incorporated by reference as if fully set forth herein.

BACKGROUND OF THE INVENTION

1) Field of the Invention

The field of the invention pertains to communications and, more particularly, to communication protocols for spread spectrum wireless communication systems.

2) Background

Wireless communication systems typically comprise a number of mobile "user stations" or "handsets" and a number of stationary or fixed "base stations" which are capable communicating with each other. Communication between the various base stations and handsets is usually accomplished by allocating communication resources among the handsets and the base stations to establish and maintain communication links between the handsets and base stations. The scarcity of communication link resources, including frequency spectrum, creates a need for the efficient allocation of these resources. While a number of techniques exist for allocating these communication link resources, including frequency division multiple access (FDMA), time division multiple access (TDMA), and code division multiple access (CDMA), none alone have proven adequate to supply the ever increasing demand for these resources.

In known wireless mobile communication systems, many more user stations are deployed than there are communication resources available for dedicated links at any one time. However, communications (e.g., telephone calls) originating or terminating at any one user station are generally sporadic, and thus it is usually neither necessary nor desirable from an economic or efficiency standpoint to reserve a single communication link for use by each user station as is sometimes done in completely land based systems. Instead, a mobile communication system typically shares communication resources among multiple user stations on an as needed basis. Where communication links are not reserved for each user station, temporary communication links between user stations and base stations are established, and when a particular communication session is completed and the link is no longer needed, the link is dissolved. Examples of such systems include land mobile radio, cellular telephone, and personal communication systems (PCS). In such systems a communication protocol is generally desirable for allocating the communication resources for communication links in response to demand.

In addition to the finite number of communication link resources in a wireless environment, RF interference is a concern and can serve to limit the number of link resources available in a given environment. In the wireless environment, RF interference can come from sources internal to the communication system or external to the communication system, or both. RF interference from internal sources may be caused by, for example, other user stations with communication links in the same or in neighboring cells, by base stations in neighboring cells, etc. RF interference from external sources may be caused by geographically collocated spectrum users operating in the same or neighboring frequency bands, and by remotely located users of the same frequency bands.

To minimize external RF interference in wireless systems, government regulations have tended to constrain the power level of signals generated by user stations and base stations. For example, in a personal communication system (PCS), existing regulations establish limitations on the allowable RF interference from user stations and base stations to fixed microwave users in the PCS bands. There are also government restrictions on the allowable RF interference from user stations and base stations to users of neighboring frequency bands. These constraints create a need for control of transmission power levels and, if possible, transmission directivity while not limiting the communication link resources.

In addition to the foregoing, communication resources are affected by geographical considerations and as such wireless communication systems should be adaptable to operate over a wide variety of changing environments, since direct line-of-sight paths between a user station and a base station are not always possible, particularly in urban areas. Also, multipath propagation conditions may vary substantially between urban and rural settings. Accordingly, a preferred system is robust and capable of accounting for multipath effects.

Another consideration in a wireless communication system is the degree of symmetry of communication traffic between user stations and base stations. In some voice-oriented mobile communication systems, such as presently known cellular telephone systems, communication traffic between the user stations and the base stations is symmetrical during most communication sessions. However, for some communication sessions involving data transmission (e.g., computer data or a facsimile) in some communication systems, communication traffic may be highly asymmetrical. Consequently, it is generally beneficial to have a communication protocol capable of handling asymmetrical communication requirements without placing further demands on communication link resources.

In addition to the foregoing, a wireless communication protocol preferably should operate with small, low cost handsets. It is therefore desirable that communication protocols be compatible with low power communication techniques, so as to extend battery life in handsets.

Spread spectrum communication techniques are well suited for use in wireless communication systems, particularly in a mobile environment. In direct sequence spread spectrum communication, a data signal is encoded with a distinguishing pseudo-random chip sequence, or spreading sequence before transmission. The spreading sequence typically contains many more "chips" than "bits" in the data signal, and thus "spreads" the data signal over a wider bandwidth than that of the data signal alone. At the receiver, the signal is typically "despread" to its original bandwidth by means of a despreading sequence matched to the spreading sequence. An informative discussion of spread spectrum communication may be found in, e.g., R. Dixon, *Spread Spectrum Systems with Commercial Applications* (J. Wiley & Sons, 3d ed. 1994).

Consequently, it would be advantageous to provide a flexible and robust communication protocol for use in wireless communication systems employing spread spectrum techniques that address the above concerns. It would be further advantageous to provide a protocol suitable for use in personal communication systems operating in a mobile environment. It would be further advantageous to provide a protocol well adapted to use with low-cost, low-power pocket telephones.

SUMMARY OF THE INVENTION

The present invention comprises in one aspect a protocol for wireless communication between base stations and user stations, either mobile or stationary, wherein the user station transmits information which is used by the base station to transmit to the user station within a predetermined time period. A preferred embodiment is particularly adapted to wireless mobile user stations which may be small, hand-held telephones or "pocket phones".

In one novel aspect of the present invention, a series of polling loops or major frames each comprising a set of time slots are utilized. In such an embodiment, communication links between a single base station and a plurality of user stations can be established by means of time division multiple access (TDMA) and time division duplex (TDD) wherein the links are defined in part by time slots. Multiple time slots may be aggregated and assigned to a single user station, or, alternatively, a sub-rate time slot may be assigned to one or more user stations.

In another novel aspect of the invention, an over-the-air protocol provides virtual time slots comprising non-contiguous time segments wherein a user station and a base station communicate with each other. The virtual time slot is divided into a user station transmit frame and a base station transmit frame.

In yet another novel aspect of the present invention, an over-the-air protocol supports closed loop power control of the signal transmitted by a user station by means of the monitoring of the signals transmitted by the user station. In a particular embodiment, two-way power control is supported whereby a user station adjusts its power in response to power control commands from a base station while also being able to request an increase in base station transmitter power.

BRIEF DESCRIPTION OF THE DRAWINGS

The various objects, features and advantages of the present invention are fully explained in the detailed description of the preferred embodiments of the invention found below, together with the figures, wherein.

DETAILED DESCRIPTION OF PREFERRED EMBODIMENTS

Figure 1:
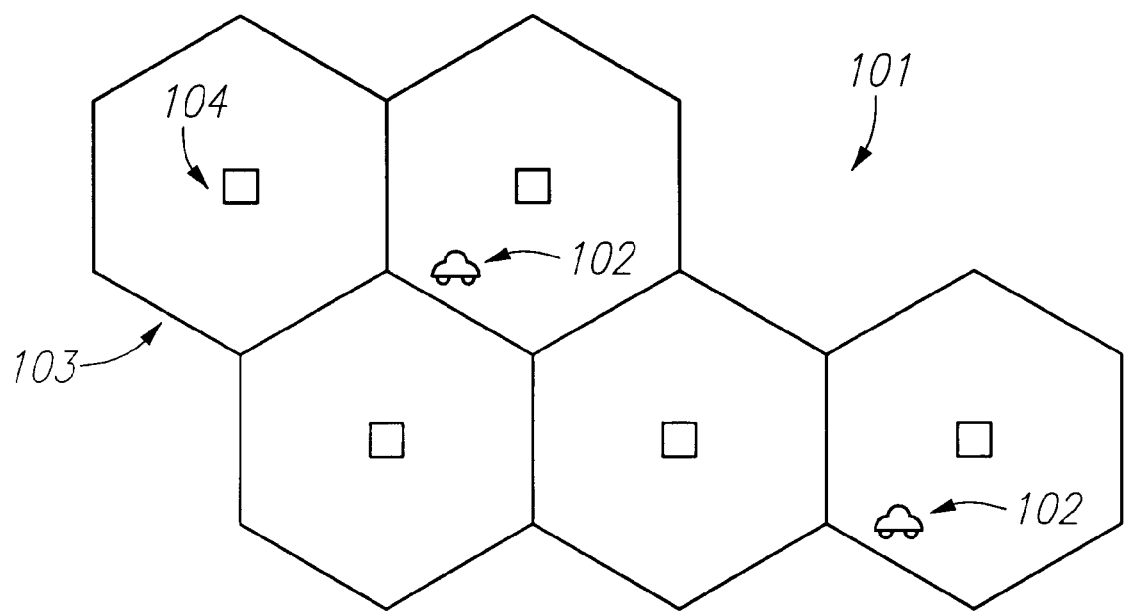
FIG. 1 is a diagrammatical representation of a communication system comprising user stations and base stations.

FIG. 1 illustrates an arrangement of cells in a communication system 101 comprising one or more user stations 102 and one or more base stations 104 arranged within a plurality of communication cells 103. Each base station 104 and user station 102 preferably comprises one or more radios each comprising a receiver, a transmitter, and one or more antennas. Each cell 103 preferably includes at least a single base station 104 located near the center of the cell 103.

Figure 2A:
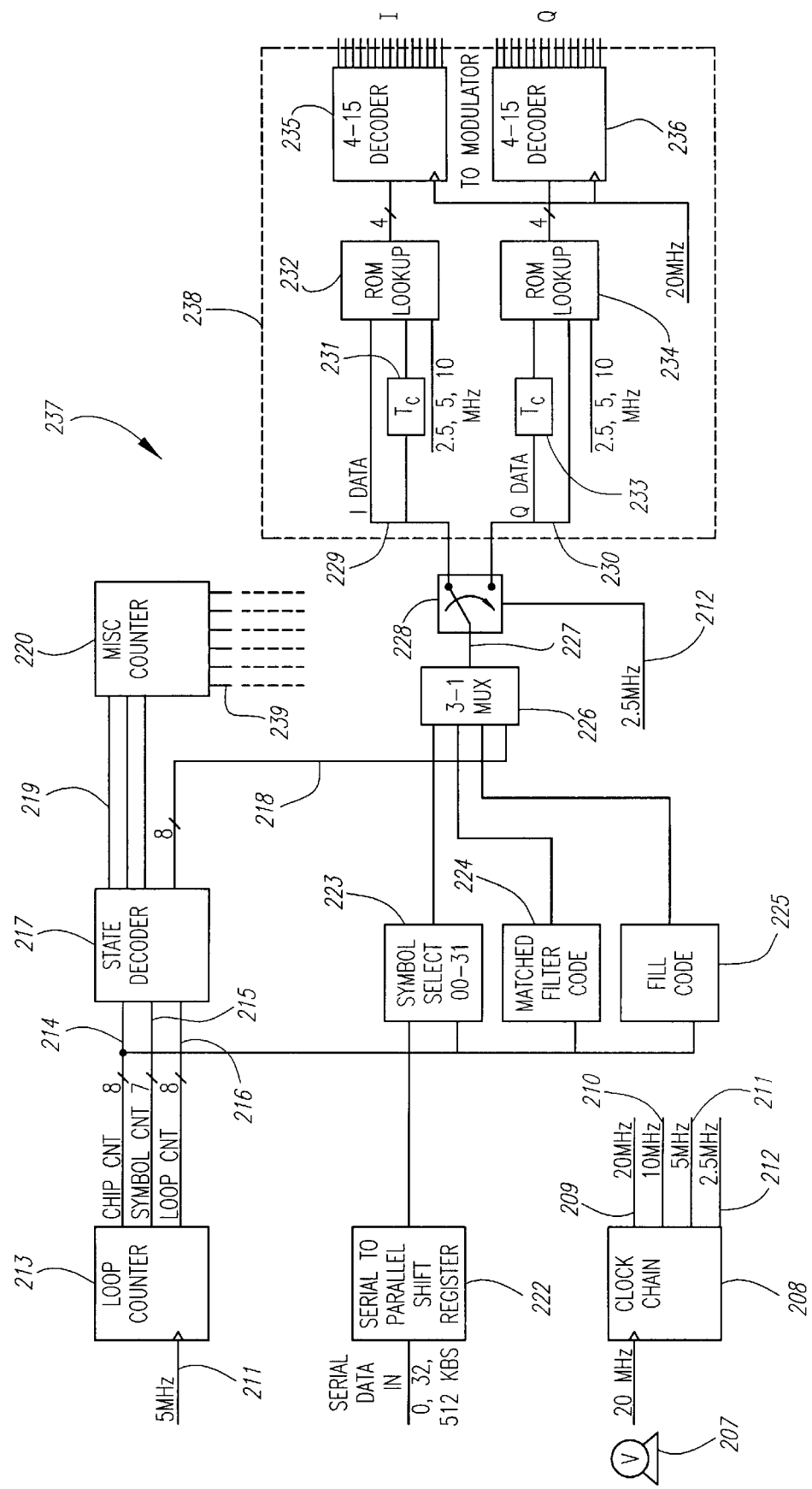
FIG. 2A is a block diagram of a preferred transmitter for transmitting continuous phase-modulated spread spectrum signals.

In a preferred embodiment, communication between base stations 104 and user stations 102 is accomplished using spread spectrum technology. FIG. 2A is a circuit block diagram illustrating a preferred transmitter for a spread spectrum communication system for spreading signals in wireless communication systems depicted in, for example, FIG. 1. FIGS. 3A–3B and 9A–9B are circuit block diagrams collectively illustrating a preferred receiver for such a system. A detailed description of the preferred transmitter of FIG. 2A and preferred receiver of FIGS. 3A–3B and 9A–9B is found later herein, following a description of the preferred embodiments of a communication system and protocol in accordance with the present invention.

Preferably, the base station 104 and user station 102 of FIG. 1 communicate using an M-ary direct sequence spreading technique in which multiple bits of data are transmitted for each spread spectrum symbol. Suitable M-ary spread spectrum transmission and reception techniques are described in, e.g., U.S. Pat. Nos. 5,022,047 and 5,455,822 and in U.S. patent application Ser. No. 08/484,007 filed Jun. 7, 1995, each of which is incorporated herein by reference as if set forth fully herein.

In a preferred embodiment, the base station 104 and user stations 102 each transmit an M-ary direct sequence spread spectrum signal, with M=32, using spread spectrum codes (called "symbol codes") of 32 chips. In an M-ary direct sequence spread spectrum signal wherein M=32, thirty-two different symbol codes are used to represent up to thirty-two different data symbols, each comprising five bits of data with phase encoding used to allow transmission of a 6th bit of data for each symbol code. Techniques of phase encoding for transmission of an additional bit of information per symbol code are described in, e.g., U.S. patent application Ser. No. 08/484,007 filed Jun. 7, 1995, which application is hereby incorporated by reference as if fully set forth herein.

Figure 1A:
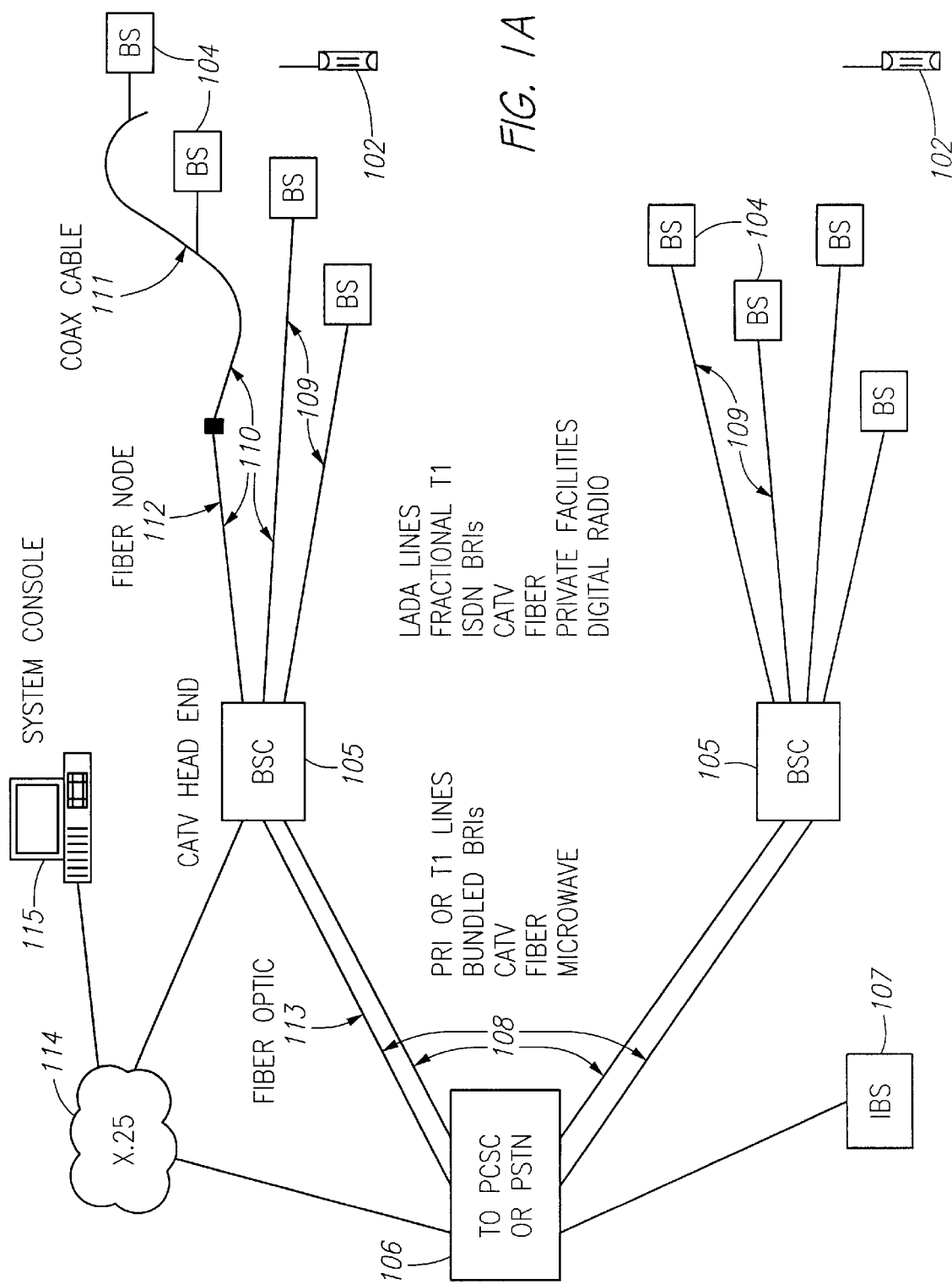
FIG. 1A is a block diagram of a communication network including user stations and base stations.

FIG. 1A shows a communication system architecture in accordance with one or more aspects of the present invention. The architecture includes a plurality of base stations 104 which communicate with a plurality of user stations 102. The base stations 104 and user stations 102 preferably operate in a personal communications system (PCS), for example, such as may be authorized under rules prescribed by the Federal Communications Commission (FCC).

Each base station 104 is shown coupled to a base station controller 105 by any of a variety of communication paths 109. The communication paths 109 each comprise one or more communication links 110. Each communication link 110 may include, e.g., a coaxial cable, a fiber optic cable, a digital radio link, or a telephone line. An exemplary communication path 109 comprising a coaxial cable 111, a fiber node 112, and a fiber optic cable 113 is illustrated in FIG. 1A.

Each base station controller 105 is preferably connected to one or more communication networks 106 such as a public switched telephone network (PSTN) or personal communication system switching center (PCSC). Each base station controller is shown connected to the communication network(s) 106 by means of one or more communication paths 108, each of which may include one or more communication links 110, examples of which are explained above.

The communication system architecture shown in FIG. 1A also may include one or more "intelligent" base stations 107 which connects a user station 102 directly to a communication network 106 without interfacing through a base station controller 105. The intelligent base stations 107 may thereby bypass the base station controllers 105 for local handoffs and switching of user stations 102, and instead perform these functions via the network 106.

In operation, the base stations 104 format and send information (typically in digital format) to the base station controller(s) 105 (or directly to the network 106 in the case of an intelligent base station 107). The base station controllers 105 shown in FIG. 1A concentrate inputs from multiple base stations 104, assist handoffs between base stations 104, and convert and format channel information and signaling information for delivery to the network 106. The base station controllers 105 if desired may also manage a local cache Visitor Location Register (VLR) database, and may support basic operations, administration and management functions such as billing, monitoring and testing. Each base station controller 105, under control of the network 106, may manage local registration and verification of its associated base station 104 and may provide updates to the network 106 regarding the status of the base stations 104.

The network 106 connects to the base station controllers 105 for call delivery and outgoing calls. Intelligent base stations 107 may use Integrated Services Digital Network (ISDN) messaging for registration, call delivery and handoff over a public telephone switch. The intelligent base station 107 may have all the general capabilities of a base station 104 but further incorporate a Basic Rate Interface (BRI) card, additional intelligence and local vocoding.

If the network 106 is part of a Global System of Mobile Communications (GSM) network, then base stations 104 preferably connect to the network 106 through a defined "A" interface. The "A" interface is preferably incorporated in base station controllers 105 and in intelligent base stations 107. Features and functionality of GSM are passed to and from the base stations 104 over the "A" interface in a manner that is transparent to the end user. Further details regarding the transfer of information within a communication system are described in, e.g., copending U.S. application Ser. No. 08/532,466 filed Sep. 22, 1995, which is hereby incorporated by reference as if set forth fully herein.

In one embodiment the system interconnects to cable television distribution networks. In this embodiment the base stations 104 are preferably miniaturized to the point where they can be installed inside standard cable TV amplifier boxes. Interfacing in this configuration is carried out using analog remote antenna systems and digital transport mechanisms. For example, T1 and fractional T1 (FT1) digital multiplexer outputs from the cable TV network may be used for interfacing, and basic BRI ISDN links to transport digital channels.

The user stations 102 comprise in one embodiment mobile handsets capable of multi-band and/or multi-mode operation. In the multi-mode embodiment, the user stations 102 are capable of both spread spectrum communication and conventional narrowband communication. In the multi-band embodiment, the user stations 102 may be set to operate on a plurality of different frequencies, such as, for example, frequencies in either the licensed or unlicensed PCS bands.

In one preferred embodiment, the user stations 102 utilize FDMA techniques. In this embodiment each user station 102 comprises a frequency synthesizer which can be programmed to receive and transmit on any of a plurality of frequency channels defined within an assigned frequency band. For example, a user station 102 may be set to operate on any frequency between 1850 and 1990 MHz in 625 kHz steps. Where communications in different cells 103 are distinguished in part by different frequencies, the user station 102 can switch frequencies, for example, when performing hand-off to a cell 103 using a different frequency than the one which is currently being used by the user station 102, or when monitoring neighboring base station transmissions to evaluate the appropriateness of a potential hand-off.

Figure 4:
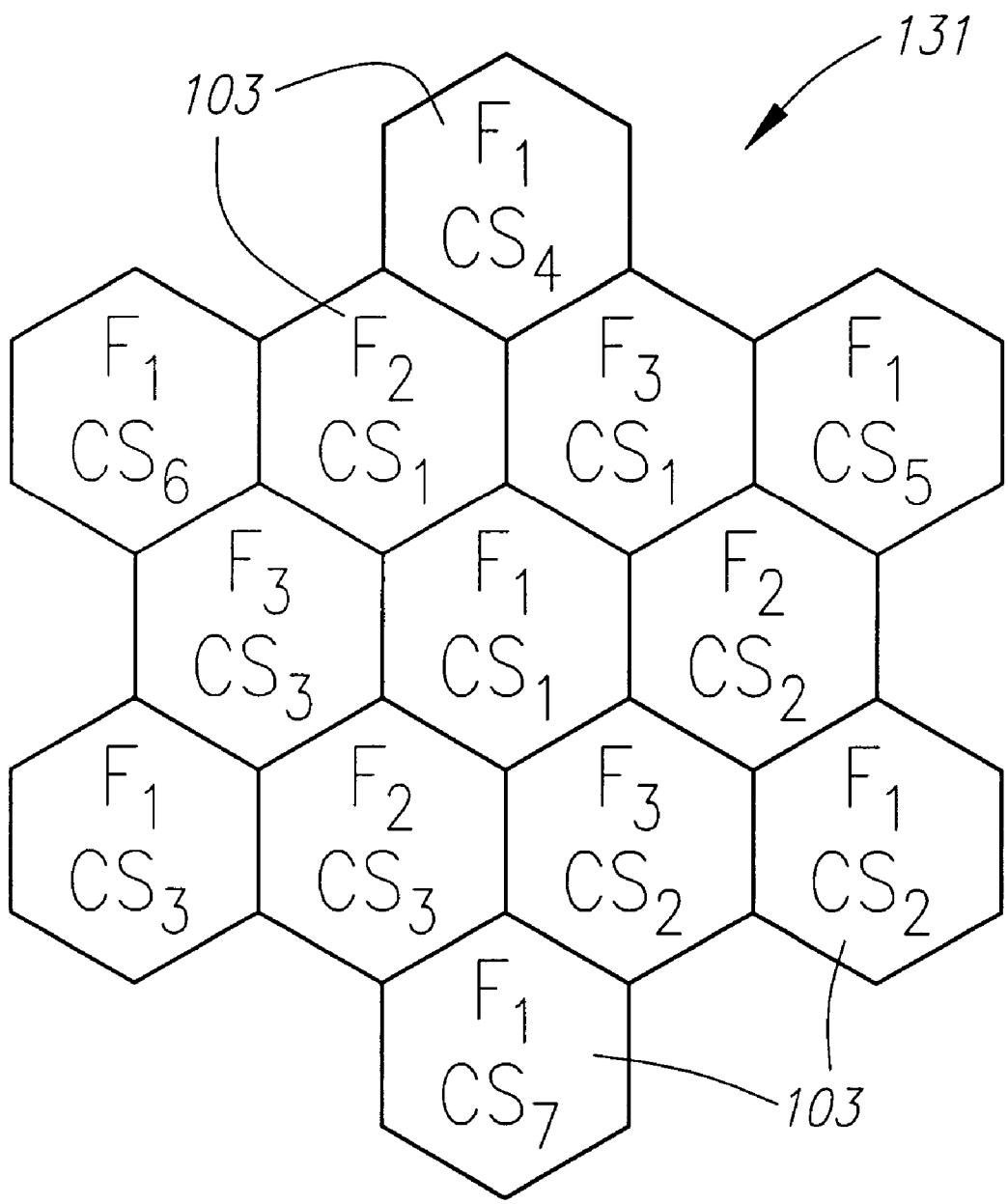
FIG. 4 is a diagram of a preferred arrangement of cells according to one or more aspects of the present invention.

FIG. 4 is a diagram of a preferred environment in which the invention may operate.

In FIG. 4, a geographical region 131 is divided into a plurality of cells 103. Associated with each cell 103 is an assigned frequency Fx and an assigned spread spectrum code Cy. Preferably, three different frequencies F1, F2 and F3 are assigned in such a manner that no two adjacent cells have the same assigned frequency F1, F2 or F3. The effect of such a frequency reuse pattern is the minimization of RF interference between adjacent cells with a minimum number of frequencies used. The preferable frequency reuse pattern is F=3.

To further reduce the possibility of intercell RF interference, different near-orthogonal spread spectrum codes C1 through C7 are assigned as shown in a repeating pattern overlapping the frequency reuse pattern. Although a repeating pattern of seven spread spectrum codes C1 through C7 is preferred, a pattern involving other numbers of spread spectrum codes may be suitable depending upon the particular application. Further information regarding a suitable cellular environment for operation of the invention may be found in U.S. Pat. No. 5,402,413 which is incorporated herein by reference as if fully set forth herein.

The use of spread spectrum techniques for carrier modulation permits a very efficient frequency reuse factor of N=3 for allocating different carrier frequencies F1, F2 and F3 to adjacent cells 103. Interference between cells 103 using the same carrier frequency F1, F2 or F3 is reduced by the propagation loss due to the distance separating the cells 103 (no two cells 103 using the same frequency F1, F2 or F3 are less than two cells 103 in distance away from one another), and also by the spread spectrum processing gain of cells 103 using the same carrier frequencies F1, F2 or F3, obtained by the use of near-orthogonal spreading codes.

Details of a particular protocol suitable for low power pocket phone operation in a PCS microcell environment is found in co-pending U.S. patent application Ser. No. 08/284,053 filed on Aug. 1, 1994, which is incorporated herein by reference as if fully set forth herein.

In a preferred embodiment, the user stations 102 and base stations 104 communicate using time division multiple access (TDMA) techniques and preferably time division duplexing (TDD). According to these techniques, a repetitive series of polling loops or major frames is provided for communication between a base station 104 and user stations 102.

Figure 5:
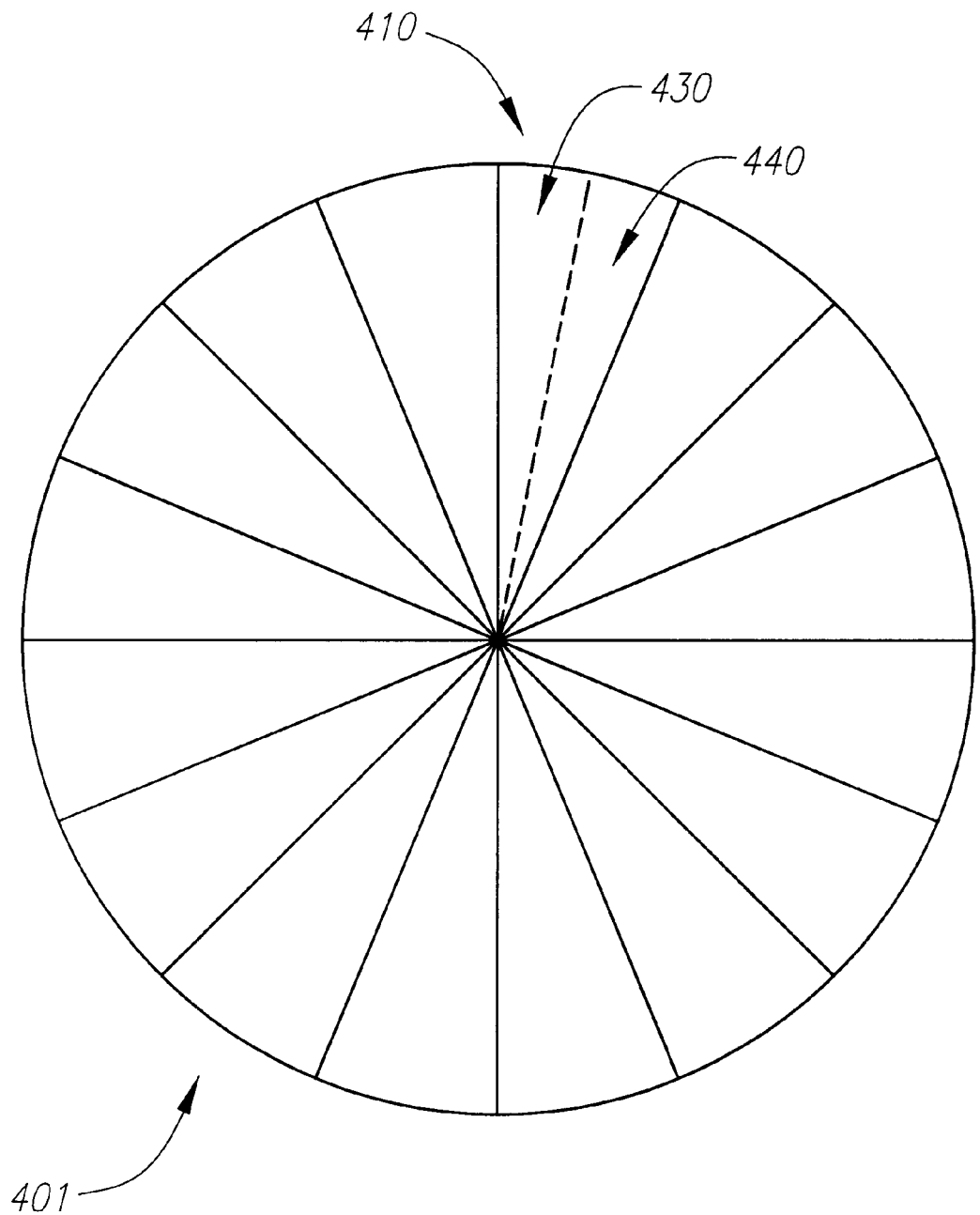
FIG. 5 is a timing diagram of a polling loop illustrating an embodiment of an over-the-air protocol according to one or more aspects of the present invention.

FIG. 5 diagrams a polling loop (also referred to as a major time frame 401) according to one embodiment of the present invention. In FIG. 5 each polling loop 401 is further divided into multiple time slots 410 which are assigned for communication between base stations 104 and user stations 102. Thus, a base station 104 may communicate with a plurality of user stations 102 on a periodic basis over consecutive polling loops 401. In a preferred embodiment, the polling loop 401 is divided into sixteen time slots 410, and each time slot 410 has a duration of 1.25 milliseconds. Alternatively, each time slot 410 may have a duration of about 1.153 milliseconds, particularly where such time slots are shared or overlaid within a co-existing GSM/TDMA system according to techniques described in, e.g., copending U.S. application Ser. No. 08/548,544 filed Oct. 26, 1995, hereby incorporated by reference as if set forth fully herein.

Figure 6:
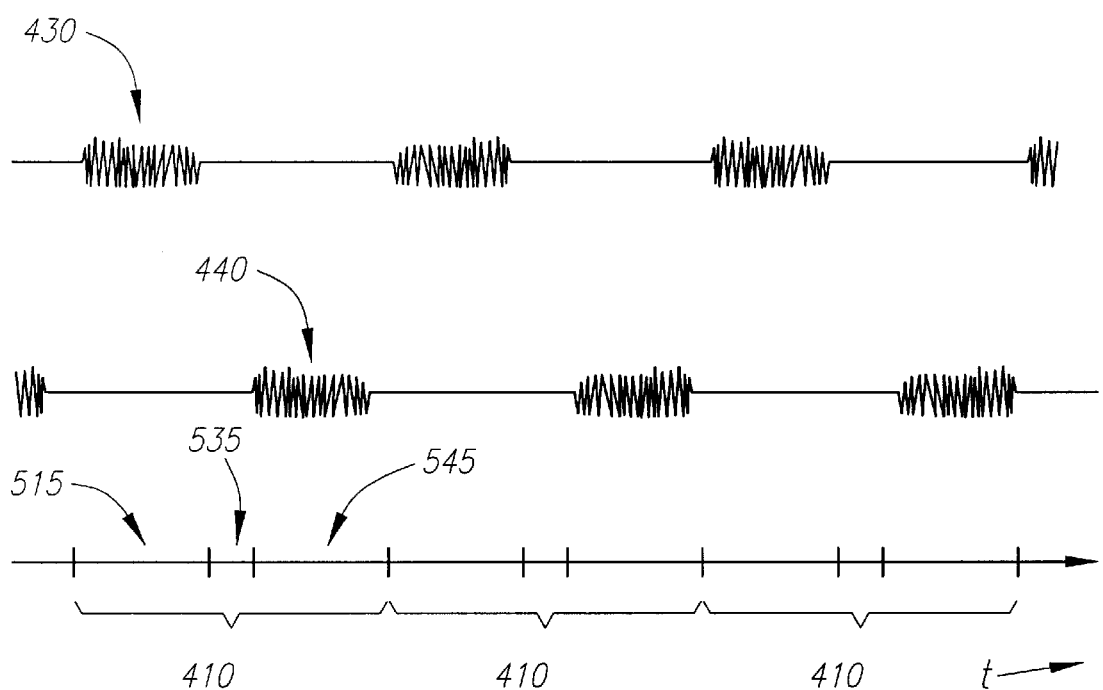
FIG. 6 is a timing diagram of three time slots in the polling loop depicted in FIG. 5 showing user station and base station transmissions.

Details of a preferred protocol for communication between a base station 102 and a user station 104 are depicted in FIG. 6, which details the preferred features of a time slot 410. In FIG. 6, a time slot 410 of polling loop 401 comprises a user station transmit frame 515, a guard time interval 535, and a base station transmit frame 545. A base station 104 transmits a base station transmission 440 during the base station transmit frame 545 to a user station 102 with which the base station 104 is communicating. The user station 102 transmits to the base station 104 a user station transmission 430 during the user station transmit frame 515.

In one aspect of the invention, the time slots 410 define a set of transmission channels. Each transmission channel preferably is defined by a separate frequency channel, a separate spread spectrum spreading code, a separate spatial direction, or some combination of separate frequency, spreading code, and spatial direction. Each time slot 410 preferably contains a user station transmission 430 and/or a base station transmission 440.

Time division duplex permits common antennas to be used for transmit and receive functions at both the base station 104 and the user stations 102, generally without the need for antenna diplexers. Common antennas can be used to transmit and receive because these functions are separated in time at each of the user stations 102 and base stations 104. The use of common antennas results in simplicity of the design of the base station 104 and user station 102. Likewise, the time separation of transmission and receive operations results in simpler transmit and receive processing and more streamlined hardware, particularly in the user stations 102.

Unlike a fixed station environment, in which antenna locations, patterns and station transmission power is adjusted for minimal interference with other fixed stations, the nature of a cellular environment with mobile user stations 102 is such that there can arise interference between user stations 102 which predominates at intersecting cell boundaries. Consequently, a user station 102 preferably has circuitry for controlling transmission power to reduce interference with adjacent cells. For example, a user station 102 operating at the boundary of coverage of one base station 104 may need to transmit at full power to stay in contact with that base station 104. On the other hand, a user station 102 operating relatively close to a base station 104 may not need to transmit full power to stay in contact with that base station 104. With proper power control, user stations 102 can stay in contact with base stations 104 without unduly interfering with neighboring cell transmissions, allowing RF channel reuse in nearby cells. Power control also reduces interference with fixed microwave users, and conserves battery power in user stations 102. Similarly, it is generally beneficial to control the power level of base station transmissions to reduce interference to fixed microwave users and to user stations 102 in neighboring cells and to conserve battery power.

In one aspect of the invention, the communication protocol allows a base station to select an antenna for communication with the transmitting user station 102. In another aspect of the invention, the protocol allows power control in a user station 102 and a base station 104.

Different types and numbers of antennas may be attached to the base station 104, depending on the type of application. For low density suburban or rural applications an omnidirectional antenna is preferable to provide maximum coverage with the fewest base stations 104. For example, an omnidirectional antenna may be employed having a vertical gain of approximately 9 dB. The 9 dB of gain permits a relatively large radius cell even with an omnidirectional horizontal pattern.

A single steered phased array antenna is preferred for applications requiring a high gain, highly directional antenna. For example, to permit a single base station 104 to cover large, sparsely populated area, a steered phased array antenna with up to 20 dB of horizontal directivity is preferred. The steered phased array antenna preferably utilizes circular polarization so that high level delayed clutter signals reflected from buildings or other obstructions within the beam path do not interfere with the received signals from the user stations 102. Because reflected signals are typically reversed in polarization, they will be largely rejected by circularly polarized antennas.

In suburban and low density urban areas, directional antennas with 120 degree azimuth beamwidths and 9 dB vertical gain are preferred so that a cell 103 can be divided into three sectors, with each sector accommodating a full load of user stations (e.g., 16 or 32 user stations 102). The use of high gain, directional antennas reduces the delay spread in severe multipath environments by rejecting multipath components arriving from outside the main beam of the antenna. Additionally, directional antennas reduce interference to user stations 102 in neighboring cells and fixed microwave facilities which may be operating nearby.

In more dense urban areas and other areas with significant multipath problems, the number of directional antennas used by a base station 104 is preferably increased to provide antenna diversity as a means of combatting signal degradations from multipath propagation. When multiple antennas are employed, circuitry for selecting an antenna for each transmission which best matches the communication channel between the base station 104 and user station 102 is preferred.

In one embodiment, the user station 102 employs a halfwave dipole antenna which is linearly polarized and provides a gain of 2 dB with an omnidirectional pattern perpendicular to the antenna axis. At a nominal frequency of 1900 MHz, a half wavelength is approximately 3 inches, which is fitted within a handset.

In the embodiment in which a base station 104 includes a plurality of antennas each of which simultaneously receives the user station transmission 430, base station 104 circuitry is preferably provided for selecting the best antenna or antennas to be used for communication with each user station 102 communicating during each time slot 410. Techniques for antenna selection are generally known in the art and may be utilized to perform the antenna selection function within the context of the presently described system.

Similarly, when the base station 104 transmits a base station transmission 440 to a particular user station 102 during a particular time slot, circuitry is preferably provided for selecting the best base station antenna for transmission. An antenna (or antennas) and a transmission power level are preferably selected to match the characteristics of the transmission channel from the base station 104 to the user station 102.

In one aspect of the communication protocol shown in FIG. 6, the same frequencies are used for the base station transmissions 440 and the corresponding user station transmissions 430. Thus, over the duration of a given period of time (e.g., a time slot 410), the characteristics of the communication channel for a base station transmission 440 to a particular user station 102 are similar for a user station transmission 430 from that particular user station 102 to the base station 104. However, the channel characteristics vary with time, especially where a user station 102 is mobile. In systems employing TDD technologies deployed in areas with multi-path signal propagation problems and/or interfering transmissions (from, e.g., the same or other mobile communication systems) during the time period of the loop, the quality metrics derived from a user station transmission 430 in a particular time slot may not be accurate in estimating the characteristics of a subsequent base station transmission channel, particularly where the base station transmission 440 occurs in the same time slot in a subsequent loop. In other words, the latency of the quality metrics derived from a user station transmission 430 is only accurate for a certain time period depending upon, for example, the geographical area in which the system is deployed, the transmission frequency, and the speed of the user station 102 (if mobile) relative to the base station 104.

As a representative example, a polling loop duration of 20 milliseconds may be considered. If the base station 104 transmits information prior to the user station 102 within a given time slot and on an antenna (or antennas) determined by the antenna selection logic after receiving the user station transmission, then the base station transmission is delayed for a full period of the polling loop. In such a case, performance may suffer in certain environments because the channel characteristics from the time the base station 104 receives the user station transmission to the time the base station 104 sends the base station transmission twenty milliseconds later will change. The preferred communication protocol of FIGS. 5 and 6 allows for the shortening of the latency of the base station 104 transmission 440 after receiving the user station transmission 430, and an improved resistance to multi-path effects and noise and/or interference.

In loop 401, during each time slot 410 a user station 102 first transmits a user station transmission 430 which is received by a base station 104. The user station transmission 430 includes sufficient information to sound the communication channel. The base station 104 receives the user station transmission 430 on a plurality of antennas, each of which produces channel characterization information. The channel characterization information is used to select a receive antenna or antennas and a transmit antenna or antennas (which may be the same as the receive antenna(s)), and to determine a transmission power level to be used for a base station transmission 440 following the user station transmission 430.

In a preferred embodiment, the elapsed time between reception of the user station transmission 430 and the beginning of the base station transmission 440 is no greater than about 1.25 msec so that the channel characteristics remain relatively constant. This technique may be referred to as a "mobile-first" or "handset-first" communication protocol, which provides a means for the base station to have valid information for selecting the best base station antenna (or antennas) and a transmission power level given the characteristics of the transmission channel between the base station 104 to the user station 102.

A user station 102 preferably initiates communication with a base station 104 according to techniques described in, for example, U.S. Pat. No. 5,455,822, hereby incorporated by reference as if set forth fully herein.

A preferred technique for initiating and maintaining communication may be explained with reference to FIG. 6, which depicts time slots 410 in a linear timewise fashion. During one or more of the base transmit frames 545 of a time slot 410, the base station 104 transmits a base station transmission 440 comprising a general poll signal, preferably indicating which, if any, time slots 410 are currently unassigned—i.e. available for communication with a user station 102. The particular user station 102 seeking to establish a communication link acquires a time slot 410 for communication with the base station 104 by monitoring the polling loop 401 (see FIG. 5) for the base station general poll signal. Upon receiving the general poll signal, the user station 102, depending upon the information contained in the general poll signal, transmits during the user station transmit frame 515 of an available time slot 410 a user station transmission 430 comprising a general poll response signal. The general poll response signal indicates a desire to establish communication with the base station 104 and identifies the particular user station 102 by including, for example, a unique ID number corresponding to that particular user station. The general poll response signal also provides information for sounding the available communication links between the base station 104 and the user station 102.

The general poll response is preferably received by the base station 104 during the mobile station transmit frame 515 of the time slot 410. The base station antennas each receive the user station transmission 430 and preferably provide channel characterization information to a processor in one or more radios in the base station during the mobile station transmit frame 515. Each base station radio preferably also stores the data (including the channel characterization information) in a data buffer. The base station preferably processes the channel characterization information during the guard interval 535 and chooses the radio which exhibited the best channel characterization quality metrics.

Based upon the channel characterization information, the base station selects an antenna and transmit power level for use in transmitting the base station transmission 440 during the base transmit frame 545 in a time slot 410. In response to the general poll response signal, the base station 104 preferably transmits a specific poll signal including identification information corresponding to the particular user station desiring to acquire the particular time slot. Because the base station preferably transmits on the antenna having the best received signal quality as determined from the information contained in the user station transmission 430, the user station 102 benefits even when it does not have antenna diversity capabilities itself.

During each time slot 410 used by a user station 102 in the loop 401, the base station 104 again characterizes the various communication links and selects an antenna and power level for a base station transmission 440 based on channel characterization information received from the immediately preceding user station transmission 430 by the particular user station 102.

Because a single base station 104 communicates with a large number of user stations 102 (e.g., as many as 16 user stations 102 in a particular embodiment) during a particular loop 401 and the distance of each of the user stations 102 from the base station 104 may vary from near zero up to the radius of the cell 103, control of the power level of the base station transmissions to maintain a near-constant received power level at each user station 102 during each time slot 410 can be maintained. Such control of the base station transmission power level requires the ability to handle large changes (e.g., more than 40 dB) in the transmission power level during each time slot 410 (e.g., every 1250 μs) of the loop 401. For economy and simplicity, as an alternative to providing power control on a user station transmission by user station transmission basis (e.g., time-slot by time-slot basis) transmission power control at the base station 104 is preferably averaged over a longer time interval comprising multiple user station transmissions.

In response to a user station transmission 430, and after determining the quality of the received signal including, for example, a received power level and a correlation level from the receiver correlator, the base station 104 during subsequent base station transmissions 440 to that user station 102 includes information requesting the user station 102 to adjust its transmission power level if desirable. The request by the base station 104 to the user station 102 to change its transmission power level in one embodiment requests an increase or decrease by a discrete amount, e.g, in minimum steps of 3 dB, relative to the user station's current setting, until the quality of the user station transmissions 430 received by the base station 104 exceeds an acceptable threshold.

In a preferred embodiment, the base station transmission includes a power adjustment command, preferably a single bit, and preferably contained within the header of each message sent to the user station 102. In this embodiment, the user station 102 temporarily stores the power adjustment bit until after receipt of the next power adjustment bit. The user station 102, before each transmission, adjusts its transmission power based on the state of the current received power adjustment bit and the value of the previous stored power adjustment bit. For example, if the current power adjustment bit and the previous power adjustment bit are both a first value (e.g., "1"), then the user station 102 will increase its transmission power; if the current power adjustment bit and the previous power adjustment bit are both a second value (e.g., "0"), then the user station 102 will decrease its transmission power; and if the current power adjustment bit and the previous power adjustment bit are different values, (e.g. "1" and "0"), the user station 102 will maintain the same transmission power.

The base station 104 can include circuitry or programming to adjust its own transmission power as well. Therefore, the user station transmission 430 preferably includes a similar power adjustment bit. As explained above, the base station 104 preferably either adjusts its power separately for each transmission or averages its power over a number of transmissions.

It should be noted that, in the preferred system described herein, the requirement of strict RF transmitter output power control is not necessary to solve the "near-far" problem commonly experienced in CDMA systems. The purpose of the power control is primarily to reduce battery consumption in user stations 102, to minimize interference of transmissions among neighboring cells 103 which may be operating on the same or adjacent RF channels, and to minimize interference with nearby fixed microwave users.

Figure 7:
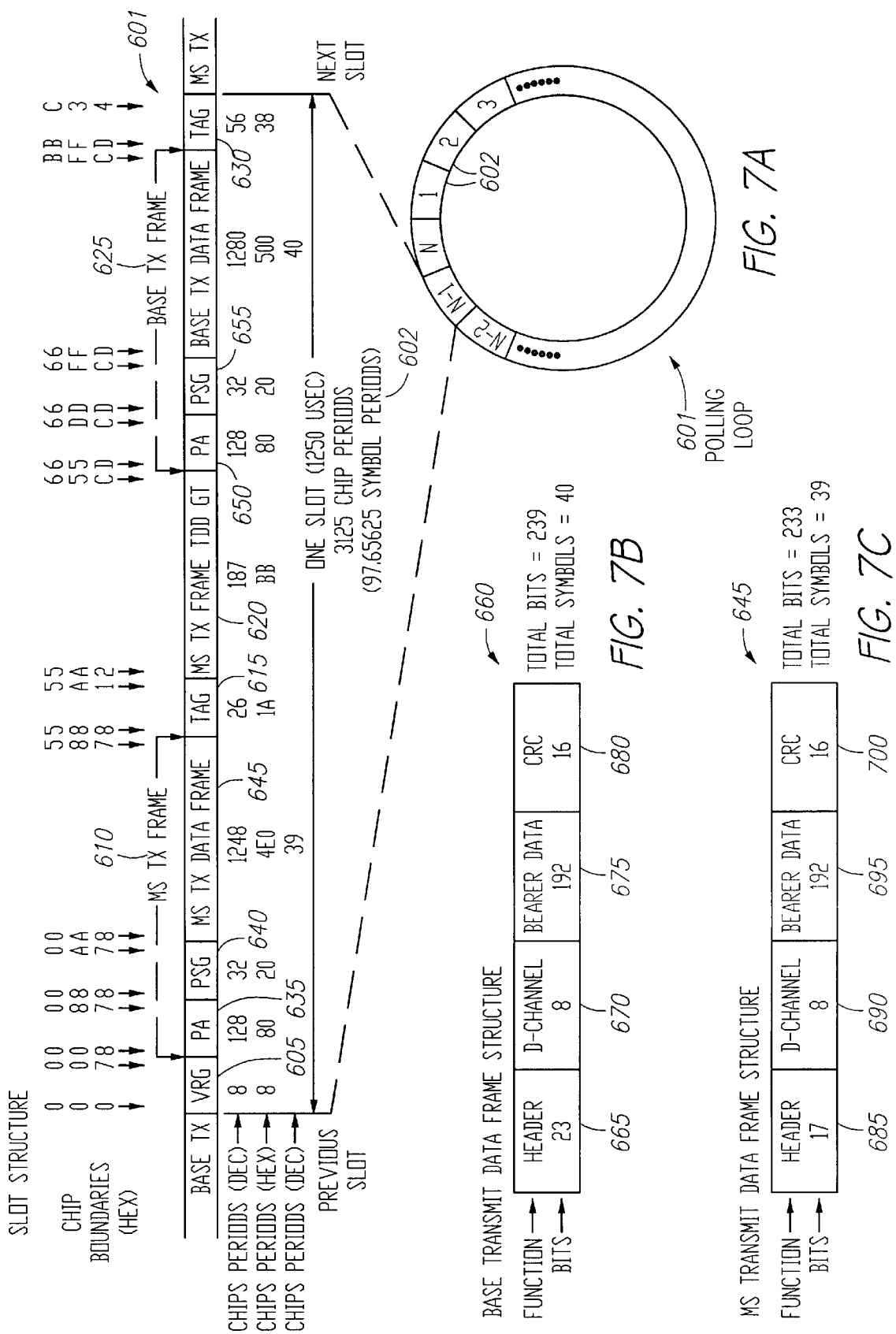
FIG. 7A is a timing diagram of a time slot structure according to one or more aspects of the present invention.
FIG. 7B is a timing diagram of a base transmit frame structure.
FIG. 7C is a timing diagram of a mobile station transmit frame structure.

FIG. 7A shows a preferred composition of a time slot 602. Time slot 602 comprises a variable radio delay gap 605, a user station transmit field 610, a base processor gap 615, a guard time 620, a base transmit field 625, and a radar gap 630. Each user station transmit field 610 comprises a user preamble 635, a user preamble sounding gap 640, and a user station data field 645. Similarly, each base transmit frame 625 comprises a base preamble 650, a base preamble sounding gap 655, and a base transmit data field 660.

FIG. 7B shows a preferred structure for the base transmit data field 660. The base transmit data field 660 comprises a base header field 665, a base D-channel field 670, a base data field 675, and a base cyclical redundancy check (CRC) field 680.

In a preferred embodiment, the base header field 665 is 23 bits, the base D-channel field 670 is 8 bits, the base data field 625 is 192 bits, and the base CRC field 680 is 16 bits.

FIG. 7C shows a preferred structure for the user station transmit data field 645. The user station data field 645 comprises a user header field 685, a user D-channel field 690, a user data field 695, and a user CRC field 697.

In a preferred embodiment, the user header field 685 is 17 bits, the user D-channel field 690 is 8 bits, the user data field 695 is 192 bits, and the user CRC field 697 is 16 bits.

Exemplary signal contents for signaling information are described in, e.g., copending U.S. application Ser. No. 08/532,466 filed Sep. 22, 1995, which is hereby incorporated by reference as if set forth fully herein.

The base station 104 and user stations 102 each preferably transmit an M-ary spread spectrum signal wherein each transmitted symbol represents N bits of data, where $N=\log_2 M$. In a preferred embodiment, as described previously, the base station 104 and user stations 102 each transmit an M-ary direct sequence spread spectrum signal, M=32, using a spreading code of 32 chips. Each transmission comprises one of thirty-two distinct symbols for a spread spectrum code sequence (called a "symbol code") of thirty-two chips. Each of the thirty-two distinct symbols is associated with a distinct 5-bit data pattern. A sixth bit of information is obtained by differential phase encoding. Thus six data bits are represented by each 32-chip spreading sequence or symbol code.

Preferably, each time slot 410 (see FIG. 6) comprises a total of 3125 chip periods, such that base station transmissions 440 during base transmit frames 545, and user station transmissions 430 during mobile station transmit frames 515, each operate at a chip rate of 2.5 Mchips/second. In that case, each symbol period is 12.8 μsec., yielding a burst data rate of 468.75 kbps.

The user-first protocol embodiment described above with respect to FIGS. 5 and 6 (and elsewhere herein) preferably includes a base station 104 with a processor having sufficient speed and power to perform all required computations and comparisons of channel sounding information during the time available between the end of a user station frame 515 and the start of the base station transmit frame 545—i.e., no longer than the guard interval 535. In a preferred embodiment, the guard interval 535 is less than 75 μsec, and may be, e.g., about 10.4 μsec.

Figure 8:
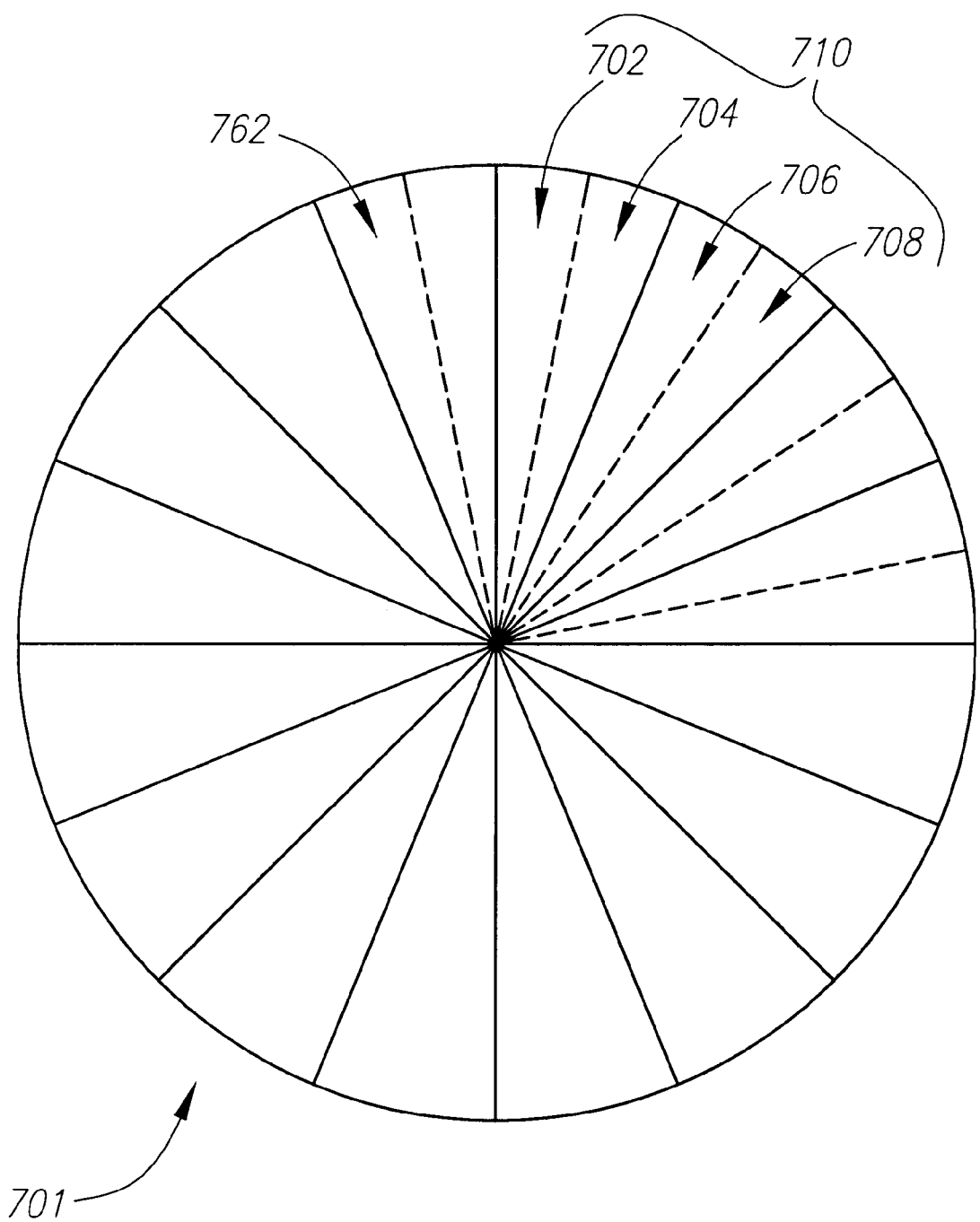
FIG. 8 is a timing diagram of a polling loop illustrating an embodiment of an over-the-air protocol according to one or more aspects of the present invention.

To reduce the base station processor requirements, a user-first protocol may operate with a loop having "virtual time slots," as described with respect to FIG. 8.

FIG. 8 is a diagram of a loop 701 divided into a plurality of virtual time slots. As shown in FIG. 8, an exemplary virtual time slot 710 comprises a first time segment 702, and a second, non-contiguous time segment 708.

In loop 701, a first user station 102 transmits a user station transmission 430 to a base station 104 during a first time segment 702. Time segment 702 is followed by a time segment 704 during which the base station 104 may transmit a base station transmission 440 to a second user station 102. Time segment 704 is followed by a time segment 706 wherein a third user station 102 may transmit a user station transmission to the base station 104. Time segment 708 follows time segment 706. During time segment 708, the base station transmits a base station transmission 440 to the first user station 102.

Time segments 702 and 708 comprise a virtual time slot 710 for communication between a particular user station 102 and the base station 104. During time segment 708, the base station 104 transmits a base station transmission 440 which responds to a message received from the user station transmission 430 during time segment 702. The base station 104 may also derive channel characterization information from the user station transmission 430 during time segment 702 for use during the base station transmission 440 during time segment 708.

In a preferred embodiment, the first time segment 702 of virtual time slot 710 is separated in time from the second time segment 708 by a time interval which has a duration equal to one time slot. This provides the base station processor with a time period exceeding the time for one slot during which it processes the channel characterization information from the user station transmission 430 from a particular user station 102 before a base station transmission 440 to that particular user station 102. This protocol relaxes the processor speed and power requirements, leading to smaller, lower-power, and less expensive base stations 104.

Although the first and second segments of a virtual time slot are preferably separated in time by a period equal to one time slot, other time separation amounts may be used depending upon the requirements of the particular system. For example, the time segments in a virtual time slot may be separated in time by a duration of two or more time slots.

In a preferred embodiment, the polling loop 701 comprises 32 time segments forming 16 time slots for communication between a base station 104 and a plurality of user stations 102.

In an alternative embodiment, rather than using virtual time slots, a system is provided using the time slot structure of FIG. 5 in conjunction with an upper layer protocol modification in order to provide increased processing time as needed for the base station 104 to perform all required tasks. According to this alternative embodiment, a user station 102 transmits prior to the base station 104 in each time slot in a manner similar to FIG. 5. The base station 104 performs the required computations and comparisons of channel sounding information prior to transmitting in the base station transmit frame 545 following the user station transmit frame 515. The upper layer protocol provides for a polling loop time delay so that data information (either traffic or signaling data) transmitted to the base station 104 in the user station transmit frame 515 is not responded to by the upper layer protocol at the base station 104 until the base station transmit frame 545 of the next polling loop 401. The polling loop time delay allows sufficient time for the base station 104 to perform necessary upper layer protocol functions, while maintaining the benefits of handset-first transmission in the physical layer.

As a variation of the above embodiment, the polling loop time delay is used only when necessary to accomplish upper layer functions requiring the extra processing time. In ordinary operation, the upper layer protocol of the base station 104 responds in the base station transmit frame 545 within the same time slot 410 as the received user station message, in a manner similar to that described with respect to FIG. 5. However, where the upper layer protocol requires additional time for lengthy processing functions, the base station 104 transmits a HOLD message in the base station transmit frame 545. In the next polling loop 401, the user station 102 transmits a HOLD ACK message in the user station transmit frame 515 of its time slot 410, and the base station 104 may respond with an upper layer data message responsive to the data message received in the previous polling loop 401, unless the base station 104 requires additional time in which case it may issue a HOLD command each cycle until it is ready to transmit a responsive data message.

Details of a preferred spread spectrum transmitter and receiver will now be described. A preferred spread spectrum transmitter 237 is illustrated in FIG. 2A. The spread spectrum transmitter 237 preferably transmits a continuous phase modulated (CPM) signal or variant thereof such as described, for example, in copending U.S. application Ser. No. 08/484,007 filed Jun. 7, 1995, hereby incorporated by reference as if set forth fully herein. A serial data stream 221 of information to be transmitted is provided to the transmitter 237 and converted to parallel data by a serial-to-parallel shift register 222. The parallel data output by the serial-to-parallel shift register 222 is used to select from among a plurality of symbol codes stored in a symbol code table 223. Each symbol code is preferably 32 chips in length and represents a predetermined number of data bits (preferably 5 data bits) from the serial data stream 221.

Each sixth bit of the serial data stream 221 is preferably used for phase encoding the symbol code output from the transmitter 237, as described in more detail in U.S. application Ser. No. 08/484,007, previously incorporated by reference as if fully set forth herein.

In addition to storing various symbol codes in the symbol code table 223, the transmitter also comprises a matched filter code generator 224 capable of generating a matched filter code 252, and a fill code generator 225 (which may be a table) capable of generating fill codes 253, 255. The symbol code table 223, matched filter code generator 224, and fill code generator 225 are selectively accessed by a control circuit 220 for constructing a transmission such as a base station transmission 440 or user station transmission 430, as appearing in FIG. 6 and described previously herein. A transmission may be constructed, for example, by concatenating or appending consecutive symbol codes, fill codes, and other code sequences as necessary to generate the appropriate chip sequence. The control circuit 220 has control outputs 239 connected to various parts of the circuit for the purpose of exercising synchronous control.

In a preferred embodiment, timing information is generated with a clock circuit 207 such as a crystal oscillator. The clock circuit 207 produces a 20 megahertz (MHz) clock signal and is coupled to an input of a clock chain 208. The clock chain 208 generates a plurality of output clock signals in a manner generally known in the art. The clock chain 208 has as outputs a 20 MHz clock signal 209, a 10 MHz clock signal 210, a 5 MHz clock signal 211, and a 2.5 MHz clock signal 212.

In a preferred embodiment, the 5 MHz clock signal 211 is coupled to a loop counter 213, which, among other things, counts chips over the course of each time slot 410. The loop counter 213 produces a chip count signal 214, a symbol count signal 215, and a channel count signal 216. The channel or loop count signal 216 indicates which time slot 410 is active within the polling loop 401. Thus, if there are 32 time slots 410 in a polling loop 401, the channel count signal 216 counts from 0 to 31 and then resets. When the channel count signal 216 indicates an active time slot 410 in which the transmitter 237 is authorized to transmit, the control circuit 220 may issue commands to transmit information at the appropriate time.

The symbol count signal 215 keeps track of how many symbols have been transmitted by the transmitter 237 in the data sequence 254. Thus, if the transmitter is to transmit 16 consecutive symbols as part of the data sequence 254, then the symbol count signal 215 counts from 0 to 15 and then resets.

The chip count signal 214 keeps track of how many chips have been transmitted by the transmitter 237 for the current symbol in the data sequence 254. Thus, if each symbol code is 32 chips in length, the chip count signal 214 counts from 0 to 31 and then resets. The chip count signal 214 also provides timing information for those circuits in the transmitter which are clocked at each chip time Tc.

The chip count signal 214, the symbol count signal 215, and the channel count signal 216 are coupled to a state decoder 217, which determines whether the current chip is part of the matched filter (i.e., preamble) code 635 or 650, fill code (such as may be transmitted during the preamble sounding gap 640 or 655), or data sequence symbol codes (such as may be transmitted as part of the transmit data field 645 or 660). The state decoder 217 generates a selection signal 218 and a set of control signals 219. The control signals 219 are coupled to a control circuit 220.

The serial data stream 221 is, as noted, coupled to serial-to-parallel shift register 222, which converts the serial data stream 221 to a sequence of 5-bit parallel symbols. The sequence of symbols is coupled to an input of a symbol code table 223, which selects for each symbol a specific symbol code unique to the symbol.

The chip count signal 214 is coupled to the symbol code table 223, the matched filter code generator 224, and the fill code generator 225. Outputs of the symbol code table 223, the matched filter code generator 224, and the fill code generator 225 are coupled to inputs of a 3-1 multiplexer 226. A control input of the 3-1 multiplexer 226 is coupled to the selection signal 218 from the control circuit 220. The 3-1 multiplexer 226 thus generates an output chip stream 227 in accordance with the commands provided by the control circuit 220. Specifically, the control circuit 220 may, in order to construct a user station transmit frame 610 such as shown in FIG. 7A, a fill code from the fill code generator 225 to fill the variable radio delay gap 605, a matched filter code 252 from the matched filter code generator 224, a second fill code from the fill code generator 225 to fill the preamble sounding gap 640, one or more symbol codes (depending on the amount of data to be transmitted and the data rate) for the user station data field 645 from the symbol code table 223, and a third fill code from the fill code generator 225 to fill the turn-around gap 615 and subsequent time portion until another transmission is to be made. If the transmitter 237 is in a base station 104, the control circuit 220 operates in an analogous manner to construct a base station transmit frame 625.

The output chip stream 227 from 3-1 multiplexer 226 is coupled to a demultiplexer 228, which separates its input chip stream into an I chip stream 229 and a Q chip stream 230, under control of the 2.5 MHz clock signal 212 (i.e., the demultiplexer 228 is clocked at half the chip rate Rc). The I chip stream 229 and the Q chip stream 230 are connected to a waveform generator 238 which constructs appropriate output waveforms based on the contents of the I chip stream 229 and the Q chip stream 230.

The waveform generator 238 comprises an I lookup table 232 and a Q lookup table 234, each of which comprises memory such as ROM. The I lookup table 232 and the Q lookup table 234 each contain fifteen digitized values for various amplitude outputs corresponding to the desired waveforms. By changing the contents of the lookup tables 232 and 234, the shape of the output waveforms may be suitably altered, allowing transmission of MSK, SQAM, GMSK, SQORC, or other signal format as desired.

The I lookup table 232 receives as its inputs both the present I chip from the I chip stream 229 and the previous I chip from the I chip stream 229 as stored in an I delay element 231 (e.g., a latch). By having available the immediate past I chip and the present I chip, the transmitter determines what type of transition is occurring in the I chip stream 229—that is, whether the I chip stream 229 is undergoing a 0/0 transition, a 0/1 transition, a 1/0 transition, or a 1/1 transition. The type of transition determines the shape of the output waveform. The I lookup table 232 provides as output eight sequential I waveform commands or "samples" per I chip time (i.e., 2Tc) which are connected to a digital-to-analog converter (DAC) for constructing a suitable waveform. The I lookup table 232 is provided a clock input of 20 MHz so that eight I waveform commands may be output per I chip time. In the transmitter 237 shown in FIG. 2A, the DAC for the I chip stream 229 comprises a 4–15 decoder 235 which selects one of 15 possible output lines, coupled to a resistor ladder (not shown) and a low pass filter (not shown). Of course, other types of DAC's would be suitable for this purpose.

Table 2-1 below shows an example of how the 15 outputs of the 4–15 decoder 235 relate to specific voltages to be output by the DAC to create a SQAM waveform varying between 1.5 V and 3.5 V:

TABLE 2-1

| Decoder (Hex) | Output Amplitude (V) |
| --- | --- |
| 0 | 1.5 |
| 1 | 1.5674 |
| 2 | 1.700 |
| 3 | 1.8414 |
| 4 | 1.900 |
| 5 | 3.100 |
| 6 | 3.1586 |
| 7 | 3.300 |
| 8 | 3.4326 |
| 9 | 3.500 |
| A | 3.2071 |
| B | 2.8827 |
| C | 2.500 |
| D | 2.1173 |
| E | 1.7929 |

Table 2-2 below shows a sequence of eight selected values according to Table 2-1 for constructing an appropriate waveform depending on what type of transition is occurring in the I chip stream:

TABLE 2-2

| Transition | Decoder Output Sequence |
|---|---|
| 0 -> 0 | 0, 1, 2, 3, 4, 3, 2, 1 |
| 0 -> 1 | 0, 1, E, D, C, B, A, 8 |
| 1 -> 0 | 9, 8, A, B, C, D, E, 1 |
| 1 -> 1 | 9, 8, 7, 6, 5, 6, 7, 8 |

An output corresponding to the Q chip stream 230 is generated in a similar manner to that of the I chip stream 229. The Q lookup table 234 receives as its inputs both the present Q chip from the Q chip stream 230 and the previous Q chip from the Q chip stream 230 as stored in a Q delay element 233. Based on its inputs, the Q lookup table 234 determines what type of transition is occurring in the Q chip stream 230. An output of the Q lookup table 234 is coupled to a 4–15 decoder 236, which selects one of 15 output lines for sending a signal to a DAC configured in a similar manner to that described with respect to the I chip stream 229.

Figure 2B:
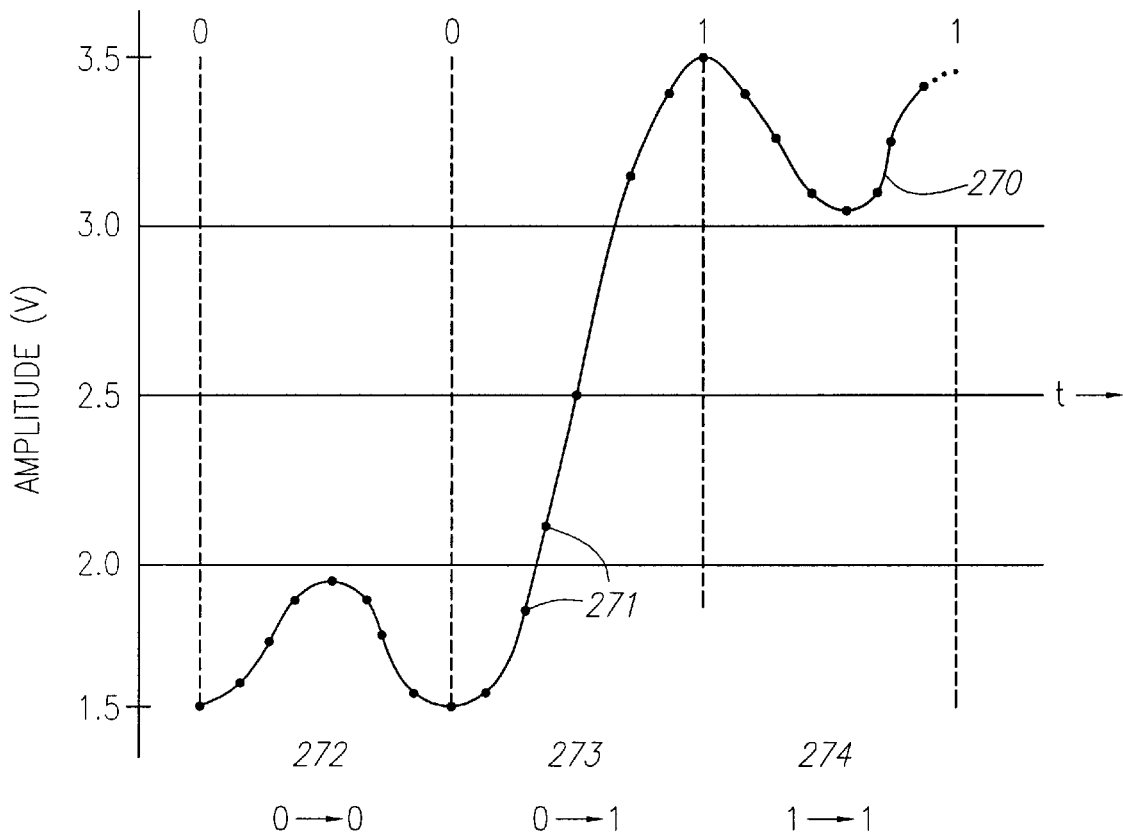
FIG. 2B is an exemplary SQAM waveform that may be generated by the FIG. 2A transmitter.

An example of an output SQAM waveform 270 generated according to the values set forth in Tables 2-1 and 2-2 is shown in FIG. 2B. The waveform 270 comprises a 0/0 transition 272, a 0/1 transition 273, and a 1/1 transition 274. Each transition 272, 273, 274 comprises eight discrete points 271 corresponding to values selected by the 4–15 I lookup table 232 (or Q lookup table 234). The effect of the low pass filter (not shown) at the output of the waveform generator 238 smooths the shape of the waveform 270 between discrete points 271.

Table 2-3 below shows an illustrative matched filter code 252. In a presently preferred embodiment, the matched filter code generator 224 is configured to generate the code shown below in Table 2-3.

TABLE 2-3

| Hexadecimal Value | Binary Value |
|---|---|
| 40 | 01000000 |
| 3E | 00111110 |
| 34 | 00110100 |
| B3 | 10110011 |
| 1A | 00011010 |
| A6 | 10100110 |

Selection of a matched filter (i.e., preamble) code for a particular application depends on the symbol codes (in a CSK system) or other chip codes being used; generally, the matched filter code is selected for low cross correlation with the other chip codes used in the particular communication environment.

Table 2-4 shows a presently preferred set of 32 symbol codes. In a preferred embodiment, the symbol code table 223 along with the appropriate commands from the control circuit 220 are configured to generate a sequence of symbol codes selected from the set of 32 symbol codes shown in Table 2-4, in response to a sequence of 5-bit parallel symbols.

TABLE 2-4

| Symbol | Symbol Code (Hex) | Symbol | Symbol Code (Hex) |
|---|---|---|---|
| 00 | 0544D65E | 10 | 0E4424A1 |
| 01 | 5B118E0B | 11 | 5B1171F4 |
| 02 | 3D77E66D | 12 | 3D771792 |
| 03 | 6822BD36 | 13 | 682242C7 |

TABLE 2-4-continued

| Symbol | Symbol Code (Hex) | Symbol | Symbol Code (Hex) |
|---|---|---|---|
| 04 | 014BD451 | 14 | 014B2BAE |
| 05 | 541E8104 | 15 | 541E7EFB |
| 06 | 3278E762 | 16 | 3278189D |
| 07 | 672DB237 | 17 | 672D4DC8 |
| 08 | 0EBBDBA1 | 18 | 0EBB245E |
| 09 | 5BEE8EF4 | 19 | 5BEE710B |
| 0A | 3D88E892 | 1A | 3D86176D |
| 0B | 68DDBDC7 | 1B | 68DD4238 |
| 0C | 01B4D4AE | 1C | 01B42B51 |
| 0D | 54E181FB | 1D | 54E17ED4 |
| 0E | 3287E79D | 1E | 32671862 |
| 0F | 67D2B2C8 | 1F | 67D24D37 |

FIGS. 3A, 3B, 9A and 9B collectively illustrate a preferred receiver.

The illustrated receiver generally operates by correlating to a preceding spread spectrum code (e.g., preamble code transmitted in preamble field 635 or 650 of FIG. 7A) with a non-coherent parallel correlator to achieve synchronization for a plurality of serial correlators. The serial CPM correlators are then used for correlating to a following message (e.g., data transmitted in data transmit frames of FIGS. 7B or 7C). However, many alternate configurations using, for example, only parallel correlators, only serial correlators, or various combinations of parallel and serial correlators, may be used in the receiver. In a preferred embodiment, multi-bit correlators as described in U.S. application Ser. No. 08/484, 007, previously incorporated herein by reference, are used for the plurality of serial correlators.

Figure 9A:
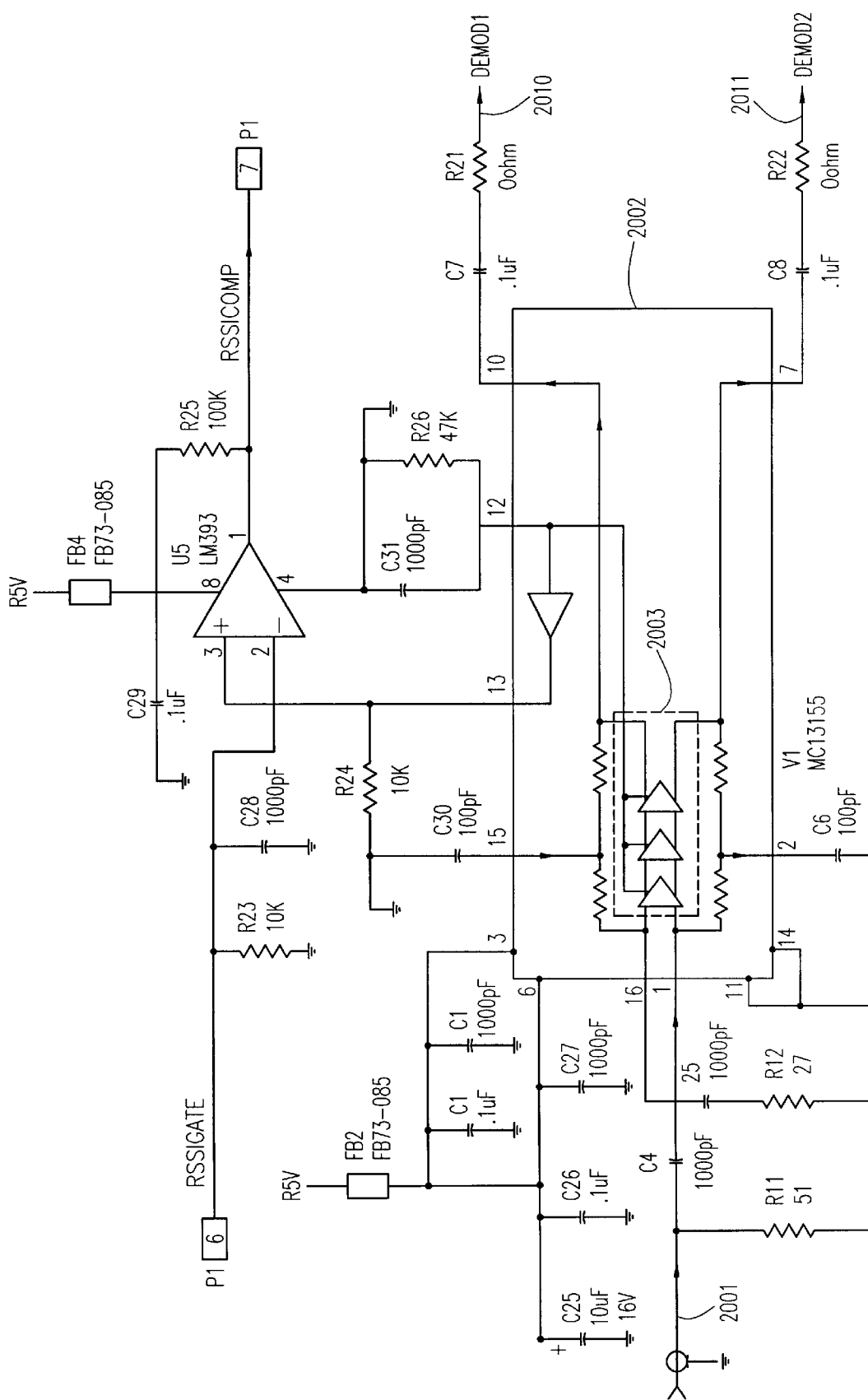
FIGS. 9A and 9B are circuit diagrams of a preferred receiving system used in conjunction with the circuitry shown in FIGS. 3A and 3B.
Figure 9B:
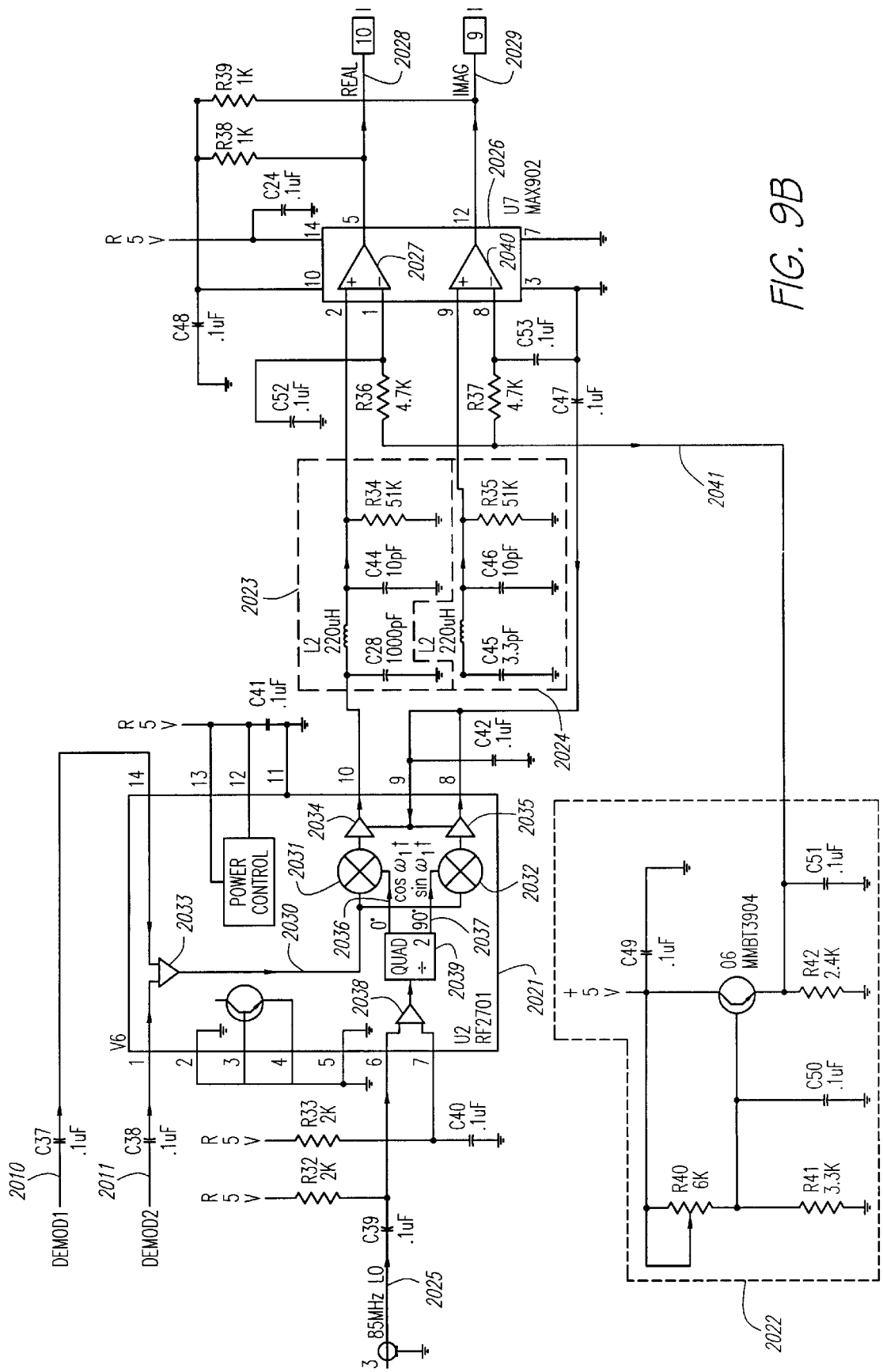

A preferred front-end of a receiver is shown in FIGS. 9A and 9B. In the embodiment of FIGS. 9A–9B, a received signal 2001 is provided to an IF amplifier shown in FIG. 9A. The received signal 2001 may undergo prior conditioning and may be downconverted to an intermediate frequency for processing. The received signal 2001 is coupled to a capacitor C4 which passes the high frequency components of the received signal 2001. The output of the capacitor C4 is coupled to a first integrated chip U1 which is preferably an MC13155 chip manufactured by Motorola. Specifically, the output of capacitor C4 is coupled to a hardlimit amplifier 2003 located on the first integrated chip U1 for hardlimiting the output of capacitor C4. The hardlimit amplifier provides a differential output comprising a first differential output signal 2010 and a second differential output signal 2011.

The differential output signals 2010, 2011 are coupled to a second integrated circuit U2 which, as shown in FIG. 9B, is preferably an RF2701 chip manufactured by RF Micro Devices. Specifically, the differential output signals 2010, 2011 are coupled to a differential amplifier 2033 which produces an amplified output signal 2030. The amplified output signal 2030 is split into two branches by a power divider (not shown) and coupled via a first branch to a first multiplier 2031 and via a second branch to a second multiplier 2032. The first multiplier 2031 has as a second input a reference signal 2036 comprising a first square wave of frequency $\omega_1 t$ (which, after low pass filtering, becomes cos $\omega_1 t$), and the second multiplier 2032 has as another input a reference signal 2037 comprising a second square wave of frequency $\omega_1 t$ (which, after low pass filtering, becomes sin $\omega_1 t$) phase offset from the first square wave by 90 degrees.

The reference signals 2036, 2037 are generated from a local oscillator (not shown) which provides a local oscillator signal 2025 to filter capacitor C39, the output of which is connected to the second integrated chip U2. Specifically, the output of capacitor C39 is connected to an amplifier 2038, the output of which is coupled to a quad divide-by-two circuit 2039 for splitting its input into two reference signals 2036, 2037, the first reference signal 2036 having a 0-degree delay and the second reference signal 2037 having a 90-degree delay. The outputs of multipliers 2031 and 2032 are amplified by a first output amplifier 2034 and a second output amplifier 2035, respectively.

The output of the first output amplifier 2034 is coupled to a first low pass filter 2023, and the output of the second output amplifier 2035 is coupled to a second low pass filter 2024. The output of the first low pass filter 2023 is connected to one input of a first comparator 2027. The output of the second low pass filter 2024 is connected to one input of a second comparator 2040. The first comparator 2027 and second comparator 2040 each have as a second input a DC threshold signal 2041 generated by a DC bias circuit 2022. The DC threshold signal 2041 is coupled to the first comparator 2027 by a low pass filter comprising capacitor C52 and resistor R36, and similarly to the second comparator 2040 by a low pass filter comprising capacitor C53 and resistor R37. The first comparator 2027 and second comparator 2040 provide output signals 2028 and 2029, respectively, each of which comprises a TTL level signal suitable for further processing using digital circuits. In particular, output signals 2028 and 2029 may each comprise a square wave signal having values of +1 and 0 times a fixed voltage.

Figure 3A:
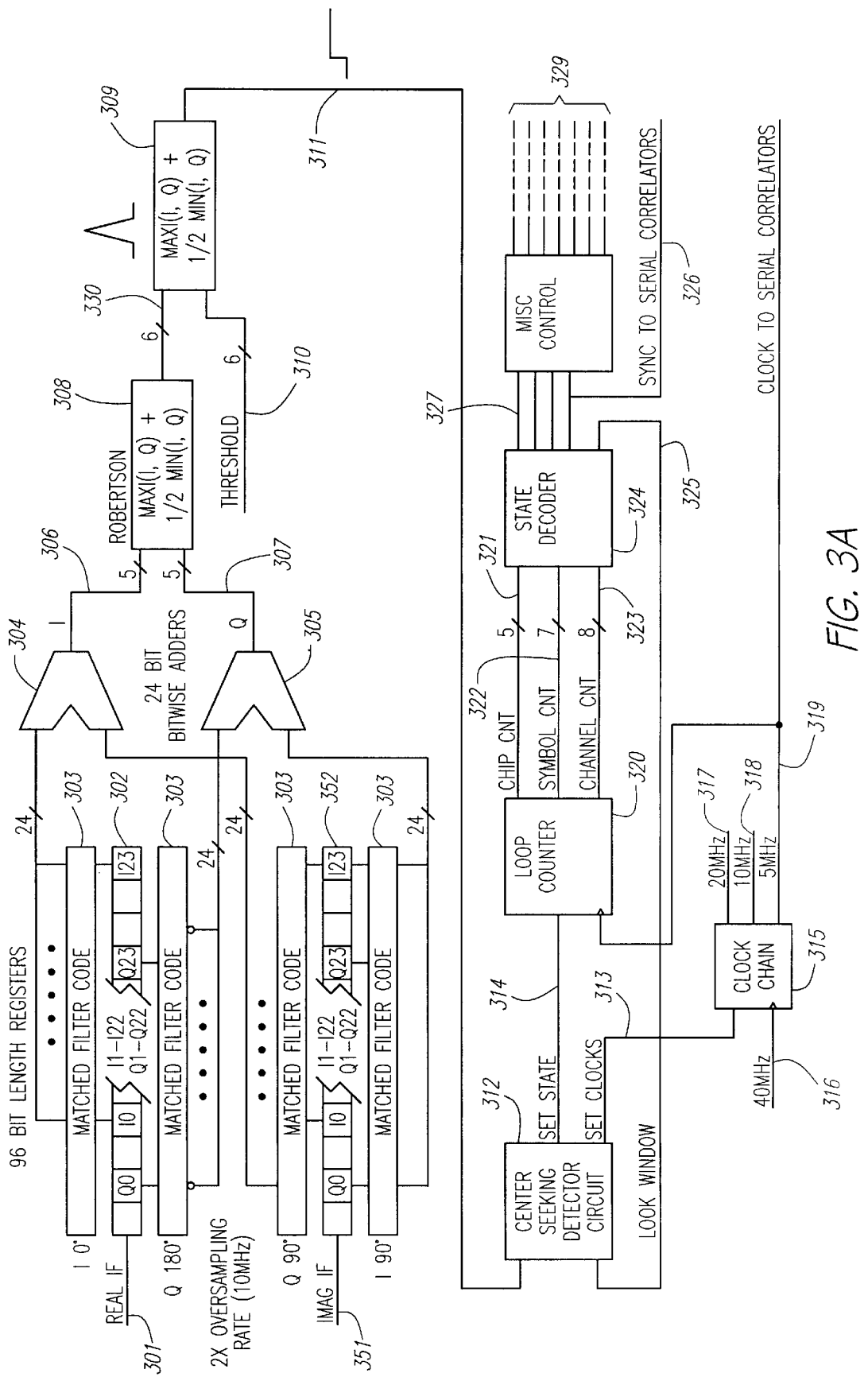
FIGS. 3A and 3B are circuit block diagrams of a preferred spread-spectrum receiver.
Figure 3B:
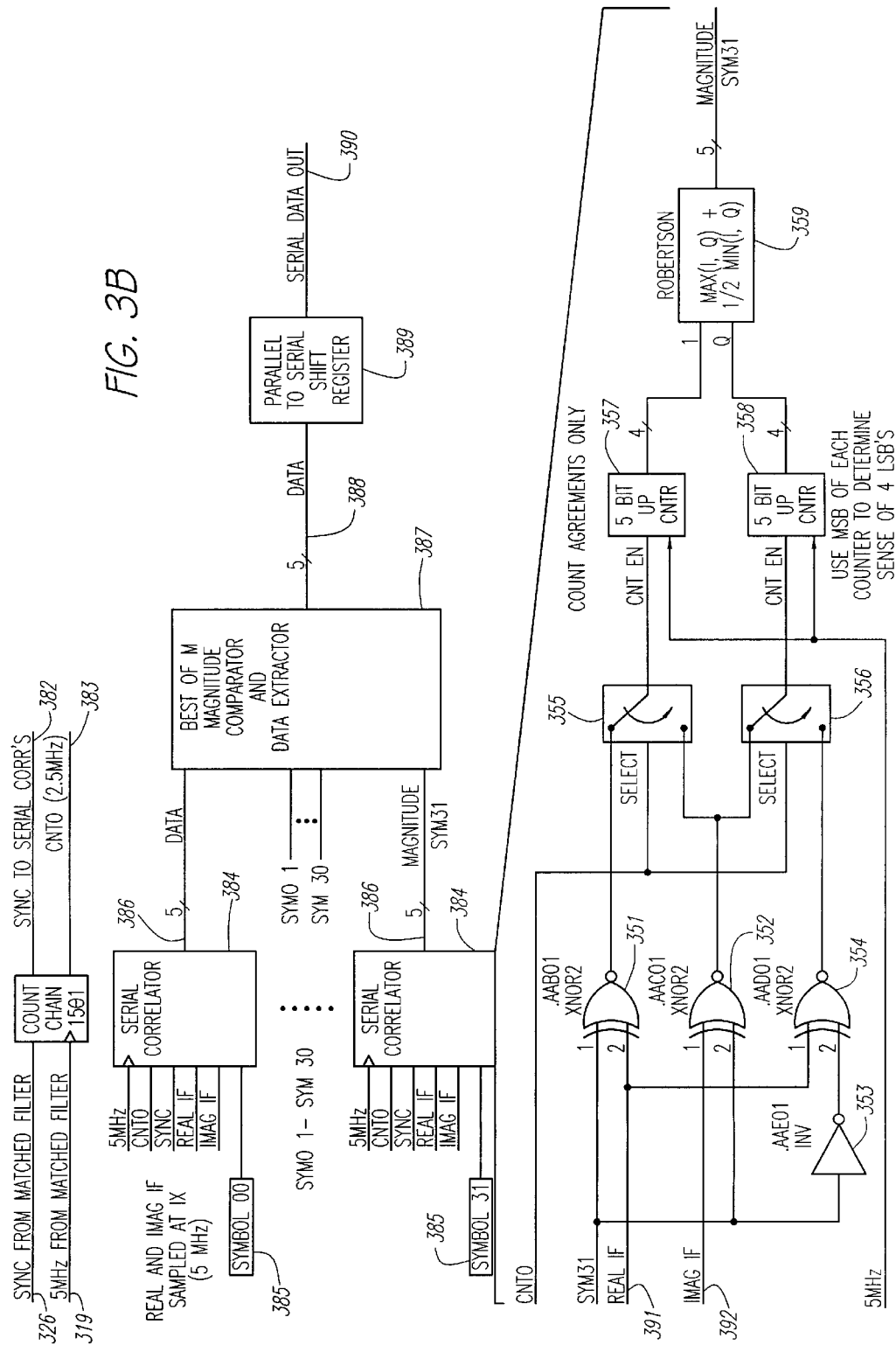

In a preferred embodiment, the output signals 2028 and 2029 are sampled and provided to additional receiver circuitry as shown in FIGS. 3A and 3B. Specifically, the output signals 2028 and 2029 are sampled twice per chip time (i.e., at 10 MHz) and then provided to the circuitry in FIG. 3A, and once per chip time (i.e., at 5 MHz) and then provided to the circuitry in FIG. 3B.

FIG. 3A is a block diagram of a noncoherent matched filter and associated receiver components. Although the FIG. 3A embodiment as shown is configured to receive a preamble 48 chips in length, in a preferred embodiment the FIG. 3A receiver is configured to receive a preamble of 128 chips in length, in accordance with the preferred FIG. 7A message format, and the circuitry of FIG. 3A is scaled up appropriately.

In a preferred embodiment, a digitally sampled version of a real portion and an imaginary portion of the received signal s*(t) 401 are input to the circuitry of FIG. 3A. Thus, a real-I/imaginary-Q signal 301 is connected to signal 2028 shown in FIG. 9B, and input to an even/odd shift register 302. An imaginary-I/real-Q signal 351 is connected to signal 2029 shown in FIG. 9B, and input to an even/odd shift register 352.

In the FIG. 3A embodiment, the even/odd shift register 302 is 96 bits long (assuming a preamble length of 48 chips). Because the real-I/imaginary-Q signal 301 is clocked at twice the system clock rate, every other odd chip of the even/odd shift register 302 is selected and compared with the odd chips of the matched filter code 303. In a preferred embodiment, matches between every other odd chip of the even/odd shift register 302 and the odd chips of the matched filter code are compared. The chip matches are coupled to real adder 304 for counting. Every other even chip of the even/odd shift register 302 is compared with the even chips of the matched filter code 303, and the result of the comparison coupled to the imaginary adder 305 for counting.

In the FIG. 3A embodiment, the even/odd shift register 352 is 96 bits long (assuming a preamble length of 48 chips). Every other odd chip of the even/odd shift register 352 is compared with the odd chips of the matched filter code 303. Matches between every other odd chip of the even/odd shift register 352 and the odd chips of the matched filter code are compared. The chip matches are coupled to the real adder 304 for counting. Every other even chip of the even/odd shift register 352 is compared with the even chips of the matched filter code 303, and coupled to the imaginary adder 305 for counting.

Where the preamble is 128 chips in length, rather than 48 chips, the even/odd shift registers 302 and 352 are each 256 bits long (instead of 96 bits long), and the related circuitry is scaled up appropriately.

In the FIG. 3A embodiment, the real adder 304 has 24 individual bit inputs, each one of which may be a logical "0" to indicate no match or a logical "1" to indicate a match. The real adder 304 generates a 5-bit real sum 306 (larger for a 128-chip preamble), which represents the absolute value of the number of odd chips that were matched. The imaginary adder 305 has 24 individual bit inputs and generates a 5-bit imaginary sum 307 representing the absolute value of the number of even chips that were matched.

The real sum 306 and the imaginary sum 307 are coupled to a Robertson device 308, which computes an approximation of a square root of the sum of the squares of the real sum 306 and the imaginary sum 307, as described herein.

An output of the Robertson device 308 is coupled to an input of a comparator 309, which compares the output of the Robertson device 308 with a threshold value 310. In a preferred embodiment, the threshold value is preset, or may be set in response to a control on the receiver. The threshold value may also be set in a variety of other manners, such as in response to a control in the transmission or to receiving conditions.

A comparator 309 generates an output pulse 311. The output pulse is a logical "1" when the input 330 exceeds the threshold 310, and a logical "0" when it does not. The output pulse 311 may have a duration of 100, 200, 300 or 400 nanoseconds. The output pulse 311 is coupled to an input of a center seeking detector circuit 312, which receives the output pulse 311 and generates a set clock pulse 313 which denotes the end of the received preamble code, and which is aligned with the center of a received chip so that the receiver clock can be synchronized with the center of each received chip in a received chip stream.

In a preferred embodiment, the center seeking detector circuit 312 counts the number of logic "1" values in the output pulse 311 (i.e., the length of time that the output of the Robertson device 308 exceeds the threshold value 310), thereby measuring the duration of the output pulse 311 (e.g., from 1 to 4 clock periods of the 10 MHz clock, corresponding to up to four bits of the even/odd shift register 302 and the even/odd shift register 352). The center seeking detector circuit 312 generates a set clock pulse 313 which re-initializes a system clock for serial correlation by a set of serial correlators (see FIG. 3B) after a preset delay period. The preset delay period ensures that the serial correlation clock is properly synchronized with the center of the output pulse 311. Preferred delay periods are shown in Table 3-1:

TABLE 3-1

| Length of Output Pulse | Delay in Nanoseconds |
|---|---|
| 1 | 50 |
| 2 | 100 |
| 3 | 150 |
| 4 | 200 |

The system clock may be re-initialized at the start of each minor frame 202.

The set clock pulse 313 is coupled to a clock chain 315, which is also coupled to a locally generated 40 MHz clock signal 316. The clock chain 315 generates a 20 MHz clock signal 317, a 10 MHz clock signal 318, and a 5 MHz clock signal 319. In a preferred embodiment, the 5 MHz clock signal 319 is coupled to, among other things, a set of 32 serial correlators (see FIG. 3B).

The 5 MHz clock signal 319 is coupled to a loop counter 320. The loop counter 320 counts the number of chips received and generates a chip count signal 321, a symbol count signal 322, and a channel or loop count signal 323, similar to the chip count signal 214, symbol count signal 215, and channel count signal 216, respectively, generated in the transmitter 237 of FIG. 2A.

The chip count signal 321, symbol count signal 322, and channel count signal 323 are coupled to a state decoder 324, which determines whether the received chip is part of the preamble code, the fill code, or a data sequence symbol code, similar to the state decoder 217 in the transmitter 237, and generates a state identifier 325, similar to the selection signal 218 generated in the transmitter 237. The state identifier 325 is coupled to an input of the center seeking detector circuit 312.

The state decoder 324 generates a synchronization signal 326, which is coupled to a set of 32 serial correlators (see FIG. 3B). The state decoder 324 also generates a plurality of control signals 327, which are coupled to a control circuit 328. The control circuit 328 has control outputs 329 connected to various parts of the circuit for the purpose of exercising synchronous control.

The center seeking detector circuit 312 also generates a set state signal 314 which is used to place the loop counter 320 in a known state, or to reset the individual count signals 321, 322 and 323 associated with the loop counter 320.

FIG. 3B is a block diagram of a preferred system of serial correlators operating in parallel with one another and operating in conjunction with the circuitry of FIG. 3A and FIGS. 9A and 9B.

A digitally sampled version of a real portion and an imaginary portion of the received signal s*(t) are input to the circuitry of FIG. 3B. A real-I/imaginary-Q signal 391 and an imaginary-I/real-Q signal 392 are generated from the received signal s*(t).

In a preferred embodiment, the 5 MHz clock signal 319 and the synchronization signal 326 as described in FIG. 3A are coupled to a count chain 381, which generates an output synchronization signal 382 for the serial correlators and a counter clock 383.

The 5 MHz clock signal 319, the synchronization signal 382, the counter clock 383, the real-I/imaginary-Q signal 391 and the imaginary-I/real-Q signal 392 are each coupled to a set of 32 serial correlators 384. A set of 32 symbol generators 385, one for each symbol 00 through 1F (hexadecimal), are also coupled to each serial correlator 384.

Each serial correlator 384 recognizes a single one of the 32 symbol codes and generates a magnitude signal 386 indicating the number of agreements with that symbol code. The 32 magnitude signals 386 are coupled to a best-of-M device 387, which determines which one of the 32 magnitude signals 386 has the greatest value and generates an output symbol 388 based thereon. If serial output data is desired, the output symbol 388 may be coupled to a parallel-to-serial shift register 389, which generates a sequence of serial data bits 390 in response.

An exploded view of a preferred individual serial correlator 384 is also shown in FIG. 3B. In a preferred embodiment, the real-I/imaginary-Q signal 391 is coupled to XNOR gates 351 and 352, and the imaginary-I/real-Q signal 392 is coupled to XNOR gate 352. XNOR gates generate the inverted XOR of their inputs. Each serial correlator 384 is programmed to correlate to a different symbol code; accordingly, the appropriate symbol code is clocked into the XNOR gates 351, 352 and 354 from the symbol generator 385. The symbol code is inverted by invertor 353 before being received by XNOR gate 354 because XNOR gate 354 operates on the inverse of the q(t) signal.

Summation and integration is carried out by a pair of multiplexers 355, 356 and counters 357, 358. The outputs of the XNOR gates 351 and 352 are coupled to an real multiplexer 355; the outputs of the XNOR gates 352 and 354 are coupled to an imaginary multiplexer 356. The counter clock 383 is coupled to a control input of the real multiplexer 355 and the imaginary multiplexer 356 in order to control the integrate-and-dump function. The outputs of the real multiplexer 355 and the imaginary multiplexer 356 are coupled to the enable inputs of the real counter 357 and the imaginary counter 358, respectively. Because the received I and Q signals are time staggered, the real multiplexer 355 selects between real I and real Q signals and provides them to the real counter 357 to effectively sum and integrate the real I and real Q signals; the imaginary multiplexer 356 and imaginary counter 358 operate in an analogous manner with respect to imaginary I and imaginary Q signals.

A reset command may be provided to the real counter 357 and the imaginary counter 358 to perform an operation analogous to a "dump" as would be carried out with integrate-and-dump circuits.

The output of the real counter 357 and of the imaginary counter 358 are coupled to a Robertson device 359, which computes an approximation to the root of the sum of the squares of its inputs. An output of the Robertson device 359 is output from the serial correlator 384.

Further details regarding a preferred spread spectrum transmitter and receiver may be found in U.S. patent application Ser. No. 08/484,007, previously incorporated herein by reference as if fully set forth herein.

Other despreading and/or correlation circuits would also be suitable for use with the present invention. For example, correlators described in either of U.S. Pat. Nos. 5,016,255 or 5,022,047 could be used, each of which patents are assigned to the assignee of the present invention and hereby incorporated by reference as if fully set forth herein.

While preferred embodiments are disclosed herein, many variations are possible which remain within the concept and scope of the invention. Such variations would become clear to one of ordinary skill in the art after inspection of the specification and drawings herein. The invention therefore is not to be restricted except within the spirit and scope of any appended claims.

What is claimed is:

1. A method of communication between a base station and a user station in a communication system comprising the steps of:

defining a series of polling loops, each polling loop comprising a plurality of time slots, and each time slot comprising a first time segment and a second time segment;

transmitting a spread-spectrum user station transmission from a user station during a first time segment of one of said time slots;

receiving said spread-spectrum user station transmission at a base station;

transmitting a spread-spectrum base station transmission from said base station during a second time segment of one of said time slots, said second time segment following said first time segment and wherein the time interval between the first and second time segment is not fixed; and receiving said spread-spectrum base station transmission at said user station.

2. The method of claim 1, wherein said spread-spectrum user station transmission and said spread-spectrum base station transmission each comprise an M-ary spread spectrum signal comprising a plurality of symbols.

3. The method of claim 2 wherein each symbol represents N bits of data, where $N=\log_2 M$, and M=a number of available symbols.

4. The method of claim 1 wherein said step of transmitting a spread-spectrum user station transmission from a user station during said first time segment of one of said time slots comprises the step of transmitting a complete user station data message during said first time segment.

5. A method of time division multiplexing communication signals between a base station and a plurality of mobile stations, comprising the steps of:

separating each of a contiguous sequence of time slots into a plurality of time segments;

transmitting, during a first one of said time segments, a first spread-spectrum mobile station transmission from a first mobile station to a base station;

receiving said first spread-spectrum mobile station transmission at said base station;

transmitting, during a second one of said time segments following said first time segment wherein the time interval between time segments vary, a first spread-spectrum base station transmission from said base station to a second mobile station;

receiving said first spread-spectrum base station transmission at said second mobile station;

transmitting, during a third one of said time segments following said second time segment, a second spread-spectrum mobile station transmission from a third mobile station to said base station;

receiving said second spread-spectrum mobile station transmission at said base station;

transmitting, during a fourth one of said time segments following said third time segment, a second spread-spectrum base station transmission from said base station to said first mobile station; and receiving said second spread-spectrum base station transmission at said first mobile station.

6. The method of claim 5 wherein said first spread-spectrum mobile station transmission, said second spread-spectrum mobile station transmission, said first spread-spectrum base station transmission, and said second spread-spectrum base station transmission are each transmitted over the same frequency band.

7. The method of claim 5 wherein each of said first spread-spectrum mobile station transmission, said second spread-spectrum mobile station transmission, said first spread-spectrum base station transmission, and said second spread-spectrum base station transmission comprises an M-ary spread spectrum signal having a plurality of symbols, each symbol representing a predetermined number of data bits.

8. A method for communication between a base station and a user station comprising:

defining a series of polling loops, a polling loop of said series of polling loops comprising a plurality of time slots, a time slot of said plurality of time slots comprising two time segment;

transmitting, over a designated frequency band, a spread-spectrum user station signal from a user station to a base station during a first time segment of one of said time slots;

receiving said spread-spectrum user station signal at said base station;

transmitting, over a designated frequency band, a spread-spectrum base station signal from said base station to said user station during a second time segment subsequent to said first time segment, by no more than a predefined time interval; and receiving said spread-spectrum base station signal at said user station;

transmitting, over a designated frequency band, during a third time segment after said first time segment, but prior to said second time segment, a second spread spectrum base station signal from said base station to a second user station; receiving said second spread-spectrum base station transmission at said second user station;

transmitting, over a designated frequency band, during a fourth time segment after said third time segment but prior to said second time segment a second spread-spectrum user station signal from a third user station to said base station after said first time segment but prior to said second time segment; and receiving said second spread-spectrum user station transmission at said base station.

9. The method of claim 8 wherein said predefined time interval has a duration of one time slot.

10. The method of claim 8 wherein said first time segment and said third time segment are located in said first time slot, and said fourth time segment and said second time segment are located in a second time slot.

11. The method of claim 8 further comprising selecting from a plurality of antennas at said abase station one or more antennas for transmitting said first spread-spectrum base station signal in response to a measurement of quality of reception of said first spread-spectrum user station signal.

12. The method of claim 8 further comprising transmitting a power adjustment command from said base station to said first user station.

13. The method of claim 12 further comprising the step of measuring a received signal strength of said first spread-spectrum user station transmission.

14. A frame structure for use in a time division multiple access communication system comprising at least one base station and a plurality of user stations, said frame structure comprising:

a plurality of time frames, each having a time frame duration;

a plurality of time slots in each of said time frames;

a first time segment in each of said time slots, said first time segment of a particular time slot allocated for a first assigned user station to transmit a user station spread spectrum message to a base station, and said first time segment comprises a user station preamble interval, a user station preamble sounding gap, and a user station data transmit frame; and a second time segment in each of said time slots, said second time segment of said particular time slot allocated for said base station to transmit a base station spread spectrum message to a second assigned user station which has sent a previous message to said base station within a variable time period of less than said time frame duration, said first assigned user station different from said second assigned user station, and said first time segment preceding said second time segment.

15. A frame structure for use in a time division multiple access communication system comprising at least one base station and a plurality of user stations, said frame structure comprising:

a plurality of time frames, each having a time frame duration;

a plurality of time slots in each of said time frames;

a first time segment in each of said time slots, said first time segment of a particular time slot allocated for a first assigned user station to transmit a user station spread spectrum message to a base station; and a second time segment in each of said time slots, said second time segment of said particular time slot allocated for said base station to transmit a base station spread spectrum message to a second assigned user station which has sent a previous message to said base station within a variable time period of less than said time frame duration, said first assigned user station different from said second assigned user station, and said first time segment preceding said second time segment, and said second time segment comprises a base station preamble interval, a base station preamble sounding gap, and a base station data transmit frame.

* * * * *